(12) United States Patent
Sahar

(10) Patent No.: US 12,147,792 B2
(45) Date of Patent: *Nov. 19, 2024

(54) SHRINKING FILES BASED ON FUNCTION ANALYSIS

(71) Applicant: Aurora Labs Ltd., Tel Aviv (IL)

(72) Inventor: Carmit Sahar, Tel Aviv (IL)

(73) Assignee: Aurora Labs Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,558

(22) Filed: Sep. 6, 2023

(65) Prior Publication Data
US 2024/0134620 A1 Apr. 25, 2024
US 2024/0231781 A9 Jul. 11, 2024

Related U.S. Application Data

(63) Continuation of application No. 18/048,734, filed on Oct. 21, 2022, now Pat. No. 11,782,687.

(51) Int. Cl.
*G06F 8/41* (2018.01)

(52) U.S. Cl.
CPC ............ *G06F 8/4435* (2013.01); *G06F 8/427* (2013.01)

(58) Field of Classification Search
None
See application file for complete search history.

(56) References Cited

U.S. PATENT DOCUMENTS

| | | | |
|---|---|---|---|
| 6,405,316 B1 * | 6/2002 | Krishnan | G06F 21/125 713/190 |
| 7,089,270 B2 | 8/2006 | Ren et al. | |
| 7,269,828 B2 * | 9/2007 | Civlin | G06F 8/60 717/130 |
| 9,032,380 B1 | 5/2015 | Ruthramoorthy et al. | |
| 10,963,363 B2 | 3/2021 | Fox et al. | |
| 11,042,369 B1 | 6/2021 | Kimball et al. | |
| 11,693,635 B1 * | 7/2023 | Sahar | G06N 20/00 717/143 |
| 11,782,687 B1 * | 10/2023 | Sahar | G06F 8/4435 717/151 |
| 11,816,478 B1 * | 11/2023 | Sahar | G06F 8/427 |
| 2005/0186625 A1 | 8/2005 | Heeb | |

(Continued)

OTHER PUBLICATIONS

Extended European Search Report for Application No. 23174559.7—1203 dated Mar. 14, 2024 (8 pages).

*Primary Examiner* — Marina Lee
(74) *Attorney, Agent, or Firm* — Finnegan, Henderson, Farabow, Garrett & Dunner LLP

(57) ABSTRACT

Disclosed herein are techniques for reducing sizes of executable files. Techniques include identifying an executable file having a plurality of functions; determining, by parsing the executable file or a code structure representing the executable file, that a first and second function each comprise a common block; identifying a third function configured to perform the common block; changing the first and second functions by: removing the common block from at least one of the first or second functions; and inserting a call to the third function into at least one of the first or second functions; and updating the executable file by: replacing, in the executable file, at least one of the first or second functions with at least one of the updated first or second functions; and adding the third function to the executable file.

20 Claims, 9 Drawing Sheets

(56) References Cited

U.S. PATENT DOCUMENTS

| | | |
|---|---|---|
| 2009/0307676 A1 | 12/2009 | Price et al. |
| 2010/0306751 A1 | 12/2010 | Schneider |
| 2013/0227516 A1 | 8/2013 | Kriegsman |
| 2019/0303140 A1 | 10/2019 | Kelly |

* cited by examiner

SHRINKING FILES BASED ON FUNCTION ANALYSIS

CROSS-REFERENCE TO RELATED APPLICATIONS

This application is a continuation of U.S. patent application Ser. No. 18/048,734, filed on Oct. 21, 2022, which issued as U.S. Pat. No. 11,782,687 on Oct. 10, 2023, the disclosure of which is expressly incorporated herein by reference in its entirety.

TECHNICAL FIELD

The subject matter described herein generally relates to techniques for providing code analysis and reconfiguration for software in various types of Internet-of-Things (IoT) or other network-connected systems, which may utilize controllers such as electronic control units (ECUs) or other controllers. For example, certain disclosed embodiments are directed to analyzing code to identify ways to shrink executable file length, improve execution, and achieve other software efficiencies. These techniques may include automatically reconfiguring code based on function and subfunction analysis. Some techniques may involve shrinking software files, such as update files, based on functional analysis. Other techniques may involve matching symbols between code sets and/or determining symbol divergences.

BACKGROUND

Modern vehicles and other Internet of Things (IoT) systems often utilize many different controllers, which may need software changes from time to time. These software changes can present many technical and security challenges. For example, as software is updated over time, its content and structure may become increasingly complex and disorganized, not only increasing difficulty for software developers, but also increasing code length (i.e., a number of lines of code), software file size, and software re-configuration and verification time. In some cases, large software update files may result, which may be costly or infeasible for over-the air-updates and difficult for devices to implement, especially controllers, which often have limited processing and/or storage resources. Also, even when a device can run such a program, this can strain processing or storage resources as well as degrade system performance. In some situations, a function or group of functions may be long or complex and the change in the function may be small and simple. This can result in unnecessarily lengthy delta files (or other software change files) and heavy uses of computing resources to implement or verify software changes when aspects of these long or complex functions are changed. As software often requires extremely thorough tests, the approval process for every single change is very lengthy and costly, thus creating a need for the ability to determine the true substantive impact of software changes, which can be smaller than, and are often obfuscated by, more lengthy-appearing non-substantive changes. Moreover, as individual symbols may have respective object files that are compiled into a binary file, a small change to a few symbols can lead to drastic changes to the size and complexity of a software update file. In some scenarios, low-substance changes may be made to aspects of code, such as changing a symbol name, with little or no functional change being effected to the code. However, current systems lack vision into these kinds of changes, leading to unnecessary additions of code, further exacerbating the issues described above.

Existing approaches to software analysis and reconfiguration are not currently equipped to handle these issues. For example, manual re-factoring of functions to localize software changes using conventional means may require large amounts of time and computing resources (e.g., processing resources, memory, and/or bandwidth). Manual processes may also not determine efficient code reconfigurations, symbol matches, or other software change efficiencies. Moreover, manual processes may be unable to correctly identify formal, structural, and/or functional differences between code.

In view of the technical deficiencies of current systems, there is a need for improved systems and methods for providing comprehensive code analysis and reconfiguration for controllers and systems. The techniques discussed below offer many technological improvements in efficiency, performance, and usability. For example, according to some techniques, functions or other symbols of code may be automatically analyzed and reconfigured according to a degree of complexity. As another example, machine learning techniques may be used to identify improved efficiencies for simplifying and shrinking code over time.

Related advantages may result from the disclosed techniques involving examining changes to code, determining associated changes to subfunctions, and generating a reduced-size delta file. A reduced-size delta file may require less storage space on a device to be updated, for example, and may also allow for a more rapid update process. Similarly, a reduced-size delta file will be quicker to transmit (e.g., over-the-air), involve less bandwidth and less expense, and be more manageable throughout its lifecycle.

As yet another advantage, disclosed techniques allow for reduction in executable file size through identification of common blocks and reconfiguration of functions or other code symbols. Such techniques may produce smaller executable files. This can also facilitate easier debugging, maintenance, troubleshooting, and updating.

Some techniques, such as those described above, may also benefit from matching symbols and determining substantively different symbols. These techniques may help to further reduce the size of delta files, executable files, or other code. In some scenarios, algorithms of increasing computational complexity may be used to compare symbols to potentially identify symbol matches, which may reduce the burden on processing resources while still identifying ways to reduce update file sizes and update times. For example, a more computationally complex algorithm may examine a call graph or other structural representation of code to identify symbol matches that may be undetectable with less sophisticated algorithms.

SUMMARY

Some disclosed embodiments describe non-transitory computer-readable media, systems, and methods for using line-of-code behavior and relation models. For example, in an exemplary embodiment, a non-transitory computer-readable medium may include instructions that, when executed by at least one processor, cause the at least one processor to perform operations for automatically reconfiguring code based on function and subfunction analysis. The operations may comprise determining, by parsing a code structure representing a plurality of functions, that at least one first function has a threshold degree of complexity; identifying, in response to the determination, a plurality of subfunctions based on the at least one first function, the plurality of subfunctions having a commonality with the at least one first function; and forming a second function by reconfiguring the first function to call at least one of the identified plurality of subfunctions.

In accordance with further embodiments, at least one of the identified plurality of subfunctions is associated with an inner subfunction called by the first function.

In accordance with further embodiments, identifying the plurality of subfunctions comprises: identifying at least one block of code and at least one divider distinguishing the at least one block of code from other code.

In accordance with further embodiments, the operations further comprise: receiving an initial code file, the code structure representing the initial code file; and updating the initial code file to include the second function.

In accordance with further embodiments, the threshold degree of complexity is determined at least in part by a machine learning model; and the operations further comprise: comparing at least one of a size or complexity of a function associated with the initial code file to at least one of a size or complexity of a function associated with the updated initial code file; and based on the comparison, updating the machine learning model.

In accordance with further embodiments, the operations further comprise: receiving a user input; and determining the threshold degree of complexity based on the user input.

In accordance with further embodiments, the threshold degree of complexity is expressed as a function length quantified by at least one of: a number of characters, a number of lines of code, or an amount of storage space.

In accordance with further embodiments, the code structure comprises an abstract syntax tree (AST).

In accordance with further embodiments, the threshold degree of complexity is based on the AST.

In accordance with further embodiments, the threshold degree of complexity is expressed as a size of an abstract syntax sub-tree.

In accordance with further embodiments, the AST comprises a plurality of nodes having node types; and identifying the plurality of subfunctions is further based on the node types.

In accordance with further embodiments, the threshold degree of complexity is based on binary code of the first function.

In accordance with further embodiments, the commonality comprises at least one of a call, an argument, a statement, or a variable.

In accordance with further embodiments, the operations further comprise: generating at least one new variable; and placing the at least one new variable in at least one of the subfunctions.

In accordance with further embodiments, the code structure is associated with code configured to execute on a controller.

In accordance with further embodiments, identifying the plurality of subfunctions comprises extracting or generating at least one of the subfunctions.

In accordance with further embodiments, reconfiguring the first function comprises removing code from the first function.

In accordance with further embodiments, the commonality the plurality of subfunctions have with the at least one first function comprises at least one of: a common operation, a common command, a common sequence of commands, a common expression, a common argument, or a common line of code.

Further disclosed embodiments include a method for automatically reconfiguring code based on function and subfunction analysis. The method may comprise determining, by parsing a code structure representing a plurality of functions, that at least one first function has a threshold degree of complexity; identifying, in response to the determination, a plurality of subfunctions based on the at least one first function, the plurality of subfunctions having a commonality with the at least one first function; and forming a second function by reconfiguring the first function to call at least one of the identified plurality of subfunctions.

In another exemplary embodiment, a non-transitory computer-readable medium may include instructions that, when executed by at least one processor, cause the at least one processor to perform operations for reducing a size of a delta file. The operations may comprise receiving change code representing a change to device code installed on a device; receiving the device code; identifying, by parsing the change code or a code structure representing the change code, a first function represented by the change code; identifying, by parsing the device code or a code structure representing the device code, a second function represented by the device code; identifying a plurality of subfunctions based on the first and second functions; determining sub-changes to at least some of the plurality of subfunctions, the sub changes being associated with a change to the second function; and generating the delta file comprising object change elements, the object change elements being configured to effect the sub-changes to the device code.

In accordance with further embodiments, one of the object change elements is configured to change the second function in the device code.

In accordance with further embodiments, determining the sub-changes to the at least some of the subfunctions comprises: determining a first set of subfunctions associated with the sub-changes; and determining a second set of subfunctions not associated with the sub-changes; and the object change elements correspond to the first set of subfunctions and not the second set of subfunctions.

In accordance with further embodiments, identifying the plurality of subfunctions is further based on determining that the at least one function has a threshold degree of complexity.

In accordance with further embodiments, the code structure of at least the change code or the device code comprises an abstract syntax tree (AST); and identifying at least one of the sub-changes comprises parsing the AST.

In accordance with further embodiments, determining sub-changes to at least some of the plurality of subfunctions comprises comparing an object file of the change code to an object file of the device code.

In accordance with further embodiments, the plurality of subfunctions are identified based on a structure of the at least one function.

In accordance with further embodiments, at least one of the identified subfunctions is associated with an inner subfunction called by the at least one function.

In accordance with further embodiments, the operations further comprise transmitting the delta file to the device.

In accordance with further embodiments, the operations further comprise determining an impact to runtime associated with the delta file is below a threshold, wherein the transmitting is based on the determined impact to runtime being below the threshold.

In accordance with further embodiments, the device is a controller.

In accordance with further embodiments, the controller is an electronic control unit (ECU) in an automobile.

Further disclosed embodiments include a method for reducing a size of a delta file. The method may comprise receiving the device code; identifying, by parsing the change code or a code structure representing the change code, a first function represented by the change code; identifying, by parsing the device code or a code structure representing the device code, a second function represented by the device code; identifying a plurality of subfunctions based on the first and second functions; determining sub-changes to at least some of the plurality of subfunctions, the sub-changes being associated with a change to the second function; and generating the delta file comprising object change elements, the object change elements being configured to effect the sub-changes to the device code.

In accordance with further embodiments, one of the object change elements is configured to change the second function in the device code.

In accordance with further embodiments, determining the sub-changes to the at least some of the subfunctions comprises: determining a first set of subfunctions associated with the sub-changes; and determining a second set of subfunctions not associated with the sub-changes; and the object change elements correspond to the first set of subfunctions and not the second set of subfunctions.

In accordance with further embodiments, identifying the plurality of subfunctions is further based on determining that the at least one function has a threshold degree of complexity.

In accordance with further embodiments, the code structure of at least the change code or the device code comprises an abstract syntax tree (AST); and identifying at least one of the sub-changes comprises parsing the AST.

In accordance with further embodiments, determining sub-changes to at least some of the plurality of subfunctions comprises comparing an object file of the change code to an object file of the device code.

In accordance with further embodiments, the plurality of subfunctions are identified based on a structure of the at least one function.

In accordance with further embodiments, at least one of the identified subfunctions is associated with an inner subfunction called by the at least one function.

In another exemplary embodiment, a non-transitory computer-readable medium may include instructions that, when executed by at least one processor, cause the at least one processor to perform operations for reducing sizes of executable files. The operations may comprise identifying an executable file having a plurality of functions; determining, by parsing the executable file or a code structure representing the executable file, that a first and second function each comprise a common block; identifying a third function configured to perform the common block; changing the first and second functions by: removing the common block from at least one of the first or second functions; and inserting a call to the third function into at least one of the first or second functions; and updating the executable file by: replacing, in the executable file, at least one of the first or second functions with at least one of the updated first or second functions; and adding the third function to the executable file.

In accordance with further embodiments, determining that the first and second function each comprise the common block comprises determining an identifier associated with the common block.

In accordance with further embodiments, the identifier comprises a combination of characters.

In accordance with further embodiments, the identifier is an expression.

In accordance with further embodiments, determining that the first and second function each comprise the common block comprises determining a similar effect caused by the common block.

In accordance with further embodiments, determining the similar effect comprises performing, on the first and second functions, at least one of a static or dynamic analysis.

In accordance with further embodiments, determining that the first and second function each comprise a common block comprises determining that the first and second function each comprise a common command or common sequence of commands.

In accordance with further embodiments, the common block is identified according to a machine learning model.

In accordance with further embodiments, the third function is generated based on a structure of the first and second functions.

In accordance with further embodiments, the executable file is at least one of: configured to execute on a controller prior to the updating; or configured to execute on a controller after the updating.

Further disclosed embodiments include a method for reducing sizes of executable files. The method may comprise identifying an executable file having a plurality of functions; determining, by parsing the executable file or a code structure representing the executable file, that a first and second function each comprise a common block; identifying a third function configured to perform the common block; changing the first and second functions by: removing the common block from at least one of the first or second functions; and inserting a call to the third function into at least one of the first or second functions; and updating the executable file by: replacing, in the executable file, at least one of the first or second functions with at least one of the updated first or second functions; and adding the third function to the executable file.

In accordance with further embodiments, determining that the first and second function each comprise the common block comprises determining an identifier associated with the common block.

In accordance with further embodiments, the identifier comprises a combination of characters.

In accordance with further embodiments, the identifier is an expression.

In accordance with further embodiments, determining that the first and second function each comprise the common block comprises determining a similar effect caused by the common block.

In accordance with further embodiments, determining the similar effect comprises performing, on the first and second functions, at least one of a static or dynamic analysis.

In accordance with further embodiments, determining that the first and second function each comprise a common block comprises determining that the first and second function each comprise a common command or common sequence of commands.

In accordance with further embodiments, the common block is identified according to a machine learning model.

In accordance with further embodiments, the third function is generated based on a structure of the first and second functions.

In accordance with further embodiments, the executable file is at least one of: configured to execute on a controller prior to the updating; or configured to execute on a controller after the updating.

In another exemplary embodiment, a non-transitory computer-readable medium may include instructions that, when executed by at least one processor, cause the at least one processor to perform operations for matching symbols between code sets. The operations may comprise accessing a first symbol associated with a first version of software; accessing a second symbol associated with a second version of the software; comparing the first symbol to the second symbol; determining, based on the comparing, whether the second symbol is a functional equivalent of the first symbol; and performing a designation action based on whether the second symbol is a functional equivalent of the first symbol.

In accordance with further embodiments, performing the designation action comprises at least one of: if the second symbol is a functional equivalent of the first symbol, designating the second symbol as a match with the first symbol; or if the second symbol is not a functional equivalent of the first symbol, designating at least one of the first or second symbols as either new or deleted.

In accordance with further embodiments, the second version of software is represented by a software change file; determining whether the second symbol is a functional equivalent of the first symbol comprises determining that the second symbol is a functional equivalent of the first symbol; and the operations further comprise, based on determining that the second symbol is a functional equivalent of the first symbol, performing at least one of: providing an alert; renaming the software change file; renaming the second symbol in the software change file; or removing a portion of code associated with the second symbol from the software change file.

In accordance with further embodiments, the software change file is a delta file.

In accordance with further embodiments, comparing the first symbol to the second symbol comprises performing multiple comparisons of increasing computational intensity.

In accordance with further embodiments, comparing the first symbol to the second symbol comprises: comparing a first file name associated with the first symbol to a second file name associated with the second symbol; and comparing a first symbol name of the first symbol to a second symbol name of the second symbol; and determining whether the second symbol is a functional equivalent of the first symbol comprises determining that the second symbol is a functional equivalent of the first symbol when the first file name matches the second file name and the first symbol name matches the second symbol name.

In accordance with further embodiments, comparing the first symbol to the second symbol comprises comparing a first call graph of the first symbol with a second call graph of the second symbol; and determining whether the second symbol is a functional equivalent of the first symbol comprises determining that the second symbol is a functional equivalent of the first symbol when the first call graph matches the second call graph.

In accordance with further embodiments, comparing the first symbol to the second symbol comprises comparing a first sequence of calls associated with the first symbol with a second sequence of calls associated with the second symbol; and determining whether the second symbol is a functional equivalent of the first symbol comprises determining that the second symbol is a functional equivalent of the first symbol when the first sequence matches the second sequence.

In another exemplary embodiment, a non-transitory computer-readable medium may include instructions that, when executed by at least one processor, cause the at least one processor to perform operations for matching symbols between code sets. The operations may comprise accessing first symbols associated with a first version of software; accessing second symbols associated with a second version of the software; performing first comparisons between the first and second symbols to determine name-matching and non-name-matching first and second symbols, the first comparisons comprising comparisons between characters of the first and second symbols; performing second comparisons between the non-name-matching first and second symbols to determine call-graph-matching and non-call-graph-matching first and second symbols; the second comparisons comprising comparisons between call graphs of the first and second symbols; performing third comparisons between the non-call-graph-matching first and second symbols to determine call-sequence-matching and non-call-sequence-matching first and second symbols, the third comparisons comprising comparisons between call sequences of the first and second symbols; and reorganizing code representing the second version of software based on the first, second, and third comparisons.

Further disclosed embodiments include a method for matching symbols between code sets. The method may comprise accessing a first symbol associated with a first version of software; accessing a second symbol associated with a second version of the software; comparing the first symbol to the second symbol; determining, based on the comparing, whether the second symbol is a functional equivalent of the first symbol; and performing a designation action based on whether the second symbol is a functional equivalent of the first symbol.

In accordance with further embodiments, performing the designation action comprises at least one of: if the second symbol is a functional equivalent of the first symbol, designating the second symbol as a match with the first symbol; or if the second symbol is not a functional equivalent of the first symbol, designating at least one of the first or second symbols as either new or deleted.

In accordance with further embodiments, the second version of software is represented by a software change file; determining whether the second symbol is a functional equivalent of the first symbol comprises determining that the second symbol is a functional equivalent of the first symbol; and the method further comprises, based on determining that the second symbol is a functional equivalent of the first symbol, performing at least one of: providing an alert; renaming the software change file; renaming the second symbol in the software change file; or removing a portion of code associated with the second symbol from the software change file.

In accordance with further embodiments, the software change file is a delta file.

In accordance with further embodiments, comparing the first symbol to the second symbol comprises performing multiple comparisons of increasing computational intensity.

In accordance with further embodiments, comparing the first symbol to the second symbol comprises: comparing a first file name associated with the first symbol to a second file name associated with the second symbol; and comparing a first symbol name of the first symbol to a second symbol name of the second symbol; and determining whether the second symbol is a functional equivalent of the first symbol comprises determining that the second symbol is a functional equivalent of the first symbol when the first file name matches the second file name and the first symbol name matches the second symbol name.

In accordance with further embodiments, comparing the first symbol to the second symbol comprises comparing a first call graph of the first symbol with a second call graph of the second symbol; and determining whether the second symbol is a functional equivalent of the first symbol comprises determining that the second symbol is a functional equivalent of the first symbol when the first call graph matches the second call graph.

In accordance with further embodiments, comparing the first symbol to the second symbol comprises comparing a first sequence of calls associated with the first symbol with a second sequence of calls associated with the second symbol; and determining whether the second symbol is a functional equivalent of the first symbol comprises determining that the second symbol is a functional equivalent of the first symbol when the first sequence matches the second sequence.

Further disclosed embodiments include a method for matching symbols between code sets. The method may comprise accessing first symbols associated with a first version of software; accessing second symbols associated with a second version of the software; performing first comparisons between the first and second symbols to determine name-matching and non-name-matching first and second symbols, the first comparisons comprising comparisons between characters of the first and second symbols; performing second comparisons between the non-name-matching first and second symbols to determine call-graph-matching and non-call-graph-matching first and second symbols; the second comparisons comprising comparisons between call graphs of the first and second symbols; performing third comparisons between the non-call-graph-matching first and second symbols to determine call-sequence-matching and non-call-sequence-matching first and second symbols, the third comparisons comprising comparisons between call sequences of the first and second symbols; and reorganizing code representing the second version of software based on the first, second, and third comparisons.

Aspects of the disclosed embodiments may include one or more tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments. The one or more processors may be part of one or more devices and/or systems.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several exemplary embodiments and, together with the description, serve to explain the disclosed principles. In the drawings.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1A:
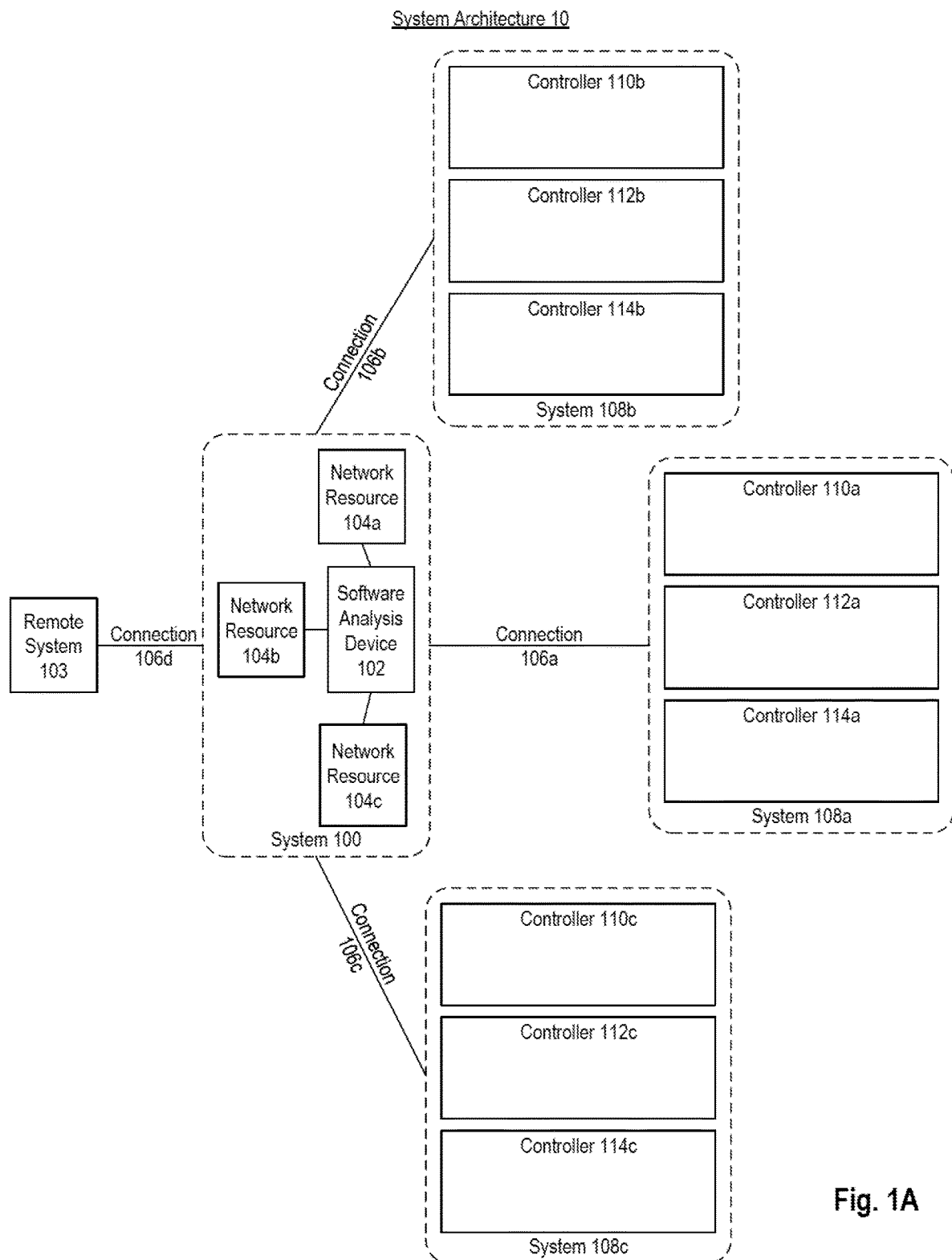
FIG. 1A illustrates an exemplary pictographic representation of a controller network for providing software analysis and software changes to controllers, consistent with embodiments of the present disclosure.

FIG. 1A illustrates an exemplary pictographic representation of system architecture 10, which may include a system 100. System 100 may be maintained by a security provider, a software developer, an entity associated with developing or improving computer software, or any combination of these or similar entities. System 100 may include a software analysis device 102, which may be a single device or combination of devices, and is described in further detail with respect to FIG. 1B. Software analysis device 102 may be in communication with any number of network resources, such as network resources 104a, 104b, and/or 104c. A network resource may be a database, supercomputer, general-purpose computer, special-purpose computer, virtual computing resource, or any other data storage or processing resource. For example, a network resource may be a container or a virtual machine, which may be spun up or spun down in response to various processing criteria. As another example, a network resource may be a database or other storage medium storing a table of symbol information (discussed further below). A database may include any number of disk drives, servers, server arrays, server blades, memories, or any other medium capable of storing data. A database may also be configured in a number of fashions, including as a textual database, a centralized database, a distributed database, a hierarchical database, a relational database (e.g., Structured Query Language, or SQL), an object-oriented database, or in any other configuration suitable for storing data. While network resources 104*a*, 104*b*, and/or 104*c* are shown externally from software analysis device 102, they may also exist internally to it, for example as hard disk partitions.

System architecture 10 may also include any number of controller systems, such as controller systems 108*a*, 108*b*, and 108*c*. A controller system may be various types of network-connected equipment, devices, or services, for example, a home security system, a parking garage sensor system, a vehicle, an inventory monitoring system, an appliance, telephony equipment, a network routing device, a smart power grid system, a drone or other unmanned vehicle, a hospital monitoring system, or any other Internet of Things (IoT) system. A controller system may include controllers arranged in a local area network (LAN), a wide area network (WAN), or any other communications network arrangement. Further, each controller system may include any number of controllers. For example, exemplary controller system 108*a* includes controllers 110*a*, 112*a*, and 114*a*, which may have the same or different functionalities or purposes. These controllers are discussed further through the description of exemplary controller 114*a*, discussed with respect to FIG. 1C. Controller systems 108*a*, 108*b*, and 108*c* may connect to system 100 through connections 106*a*, 106*b*, and 106*c*, respectively. System 100 may also connect through connection 106*d* to a remote system 103, which may include any number of computing devices (e.g., including a personal desktop computer). Remote system 103 may be associated with (e.g., hosted by) a creator of code, a manufacturer of a physical component and/or device (e.g., controller), a system (e.g., vehicle) manufacturer, or another entity associated with developing and/or deploying software. A connection 106 may be a communication channel, which may include a bus, a cable, a wireless (e.g., over-the-air) communication channel, a radio-based communication channel, a local area network (LAN), the Internet, a wireless local area network (WLAN), a wide area network (WAN), a cellular communication network, or any Internet Protocol (IP) based communication network and the like. Connections 106*a*, 106*b*, 106*c*, and 106*d* may be of the same type or of different types.

Any combination of components of system architecture 10 may perform any number of steps of the exemplary processes discussed herein, consistent with the disclosed exemplary embodiments.

Figure 1B:
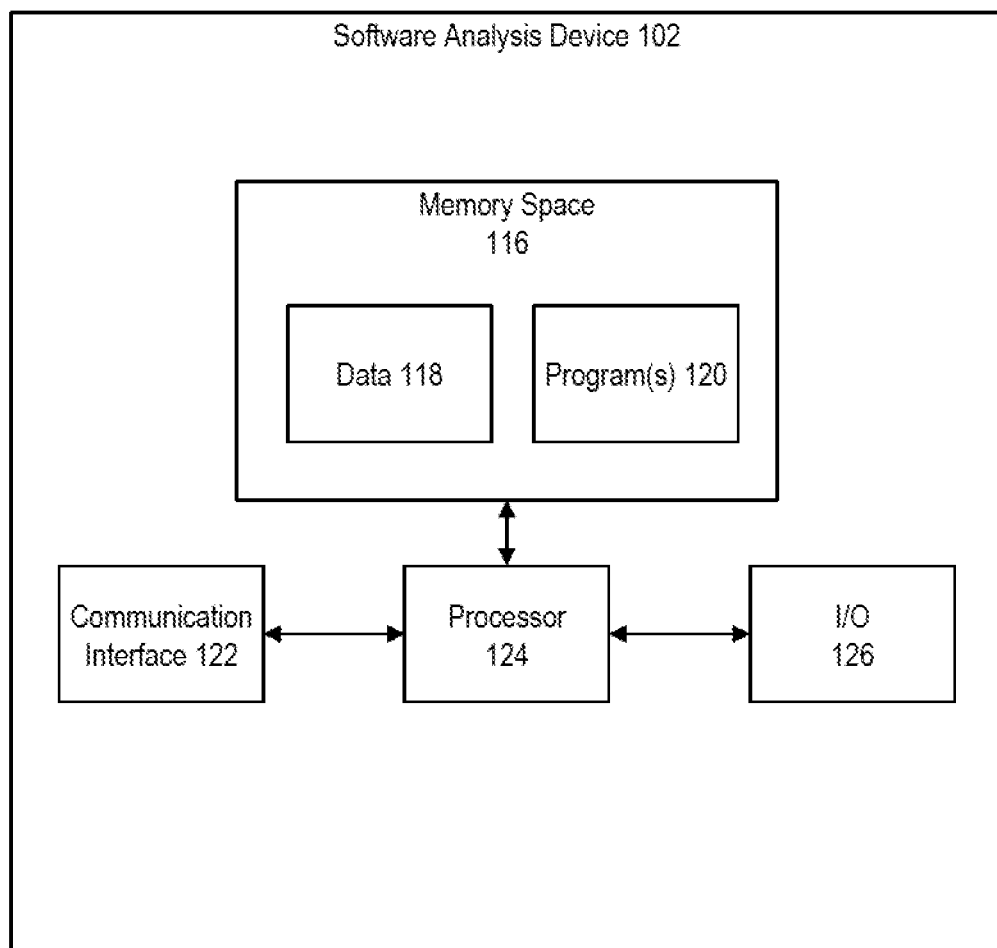
FIG. 1B illustrates an exemplary pictographic representation of a software analysis device, consistent with embodiments of the present disclosure.

FIG. 1B illustrates an exemplary pictographic representation of software analysis device 102, which may be a single device or multiple devices. For example, software analysis device 102 may be a computer, server, mobile device, special-purpose computer, or any other computing device that may perform any number of steps of the methods of the disclosed embodiments, as discussed further below. For example, software analysis device 102 may include a processor 124, discussed below, which may be configured to execute instructions stored at memory space 116. While singular instances of a component may be discussed, multiple components may be present across one or more devices. For example, software analysis device 102 may include multiple processors 124.

Software analysis device 102 may include a memory space 116 and a processor 124. In some embodiments, memory space 116 may exist across multiple software analysis devices 102. Memory space 116 may a single memory component or multiple memory components. Such memory components may include, for example, an electronic storage device, a magnetic storage device, an optical storage device, an electromagnetic storage device, a semiconductor storage device, or any suitable combination of the foregoing. For example, memory space 116 may include any number of hard disks, random access memories (RAMs), read-only memories (ROMs), erasable programmable read-only memories (EPROMs or Flash memories), and the like. Memory space 116 may store data 118, which may be used by one or more software programs to perform the processes discussed herein. For example, data 118 may include code constituting all or a portion of a controller software program, statistical data regarding software performance (actual performance or simulation), data relating to controller functions (e.g., function names, function execution times, history of function re-configurations, etc.), data obtained during operation of a system, such as a vehicle, and/or other data relating to analysis of a code symbols, which may be, model, or represent a variable, buffer, function, call, object, statement (e.g., a branching statement), identifier (e.g., memory location identifier or user-created identifier), compiled code, uncompiled code, a software package (e.g., for a software update), instruction set, or any other segment of code with ascertainable meaning. In embodiments with multiple software analysis devices 102, data 118 may exist in duplicate form across the multiple software analysis devices 102 and/or may be fragmented into different portions stored across the multiple software analysis devices 102. Memory space 116 may include one or more storage devices configured to store instructions usable by processor 124 to perform functions related to the disclosed embodiments. For example, memory space 116 may be configured with one or more software instructions, such as software program(s) 120 or code segments, that perform one or more operations when executed by processor 124 (e.g., operations discussed in connection with figures below). The disclosed embodiments are not limited to separate programs or computers configured to perform dedicated tasks. For example, memory space 116 may include a single program or multiple programs that perform the functions of system architecture 10.

In certain embodiments, memory space 116 may store software executable by processor 124 to perform one or more methods, such as the methods discussed below. The software may be implemented via a variety of programming techniques, standards, and languages, such as C, MISRA-C, C#, C+, C++, PHP, Java, JavaScript, Python, ASCET, Lua, Go, Rust, Ada, and various others. The software may also be implemented in various modeling design environments, such as Simulink and Stateflow. Further, it should be emphasized that techniques disclosed herein are not limited to automotive embodiments. Various other IoT environments may use the disclosed techniques, such as smart home appliances, network security or surveillance equipment, smart utility meters, connected sensor devices, parking garage sensors, and many more. In such embodiments, memory space 116 may store software based on a variety of programming techniques, standards, and languages such as those mentioned above.

Processor 124 may include one or more dedicated processing units, application-specific integrated circuits (ASICs), field-programmable gate arrays (FPGAs), graphical processing units, or various other types of processors or processing units coupled with memory space 116, configured or configurable to execute instructions, consistent with disclosed embodiments.

Software analysis device 102 may also include a communication interface 122, which may allow for remote devices to interact with software analysis device 102, such as remote system 103 or system 108b. Communication interface 122 may include an antenna or wired connection to allow for communication to or from software analysis device 102. For example, an external device, such as controller 114a, remote system 103, network resource 104c, or any other device communicably connected to software analysis device 102, may transmit code to software analysis device 102 for analysis and/or reconfiguration. As another example, software analysis device 102 may transmit code to a controller, such as controller 114a, instructing controller 114a to perform certain operations, such as changing software stored in memory space 116.

Software analysis device 102 may also include input/output device (I/O) 126, which may be configured to allow for a user or device to interact with software analysis device 102. For example, I/O 126 may include at least one of wired and/or wireless network cards/chip sets (e.g., WiFi-based, cellular based, etc.), an antenna, a display (e.g., graphical display, textual display, etc.), a light-emitting diode (LED), a router, a touchscreen, a keyboard, a microphone, a speaker, a haptic device, a camera, a button, a dial, a switch, a knob, a transceiver, an input device, an output device, or another I/O device configured to perform, or to allow a user to perform, any number of steps of the methods of the disclosed embodiments, as discussed further below. A display may include a liquid crystal display (LCD), in-plane switching liquid crystal display (IPS-LCD), an LED display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. A display may display graphical interfaces, interactable graphical elements, animations, dynamic graphical elements, and any other visual element.

Figure 1C:
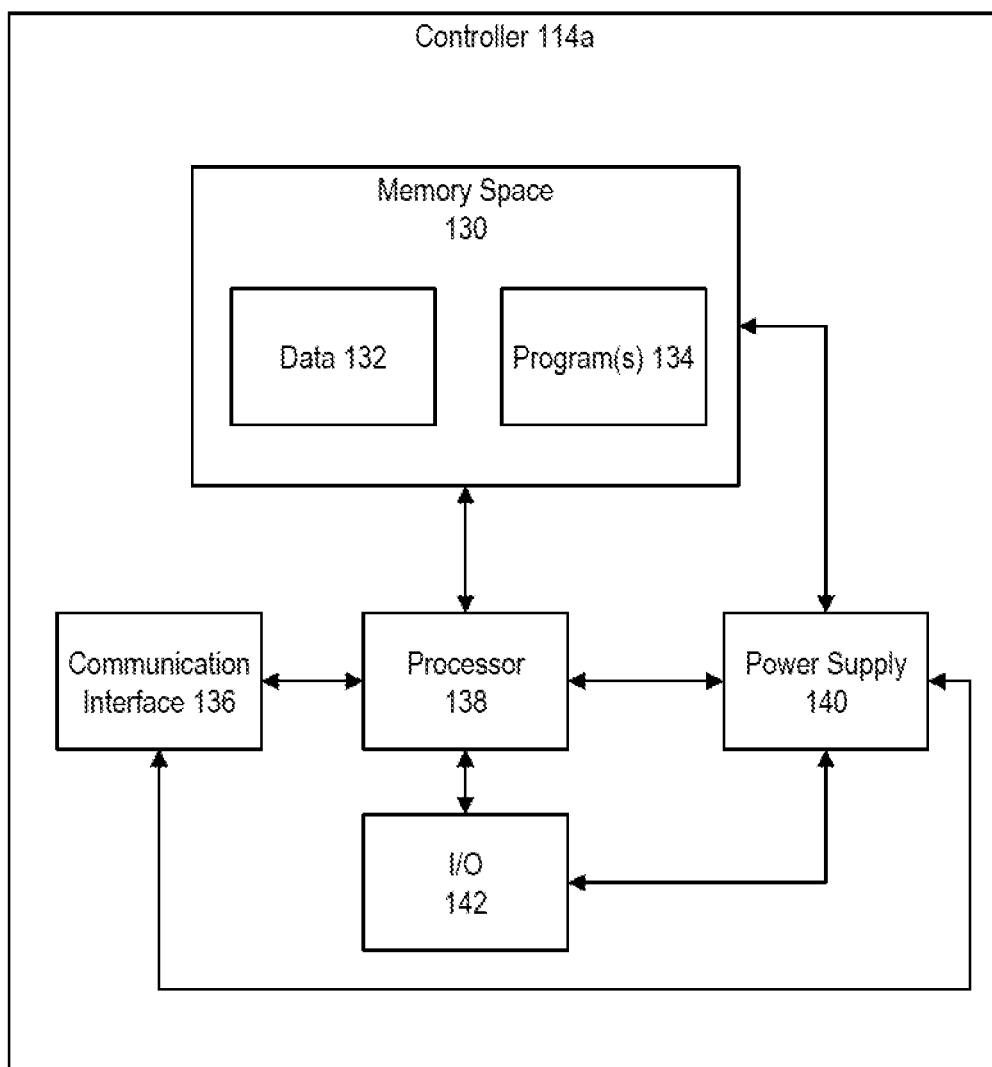
FIG. 1C illustrates an exemplary pictographic representation of a controller, consistent with embodiments of the present disclosure.

FIG. 1C illustrates an exemplary pictographic representation of controller 114a, which may be an automotive controller, such as an electronic control unit (ECU) (e.g., manufactured by companies such as Bosch™, Delphi Electronics™, Continenta™, Denso™, etc.), or may be a non-automotive controller, such as an IoT controller manufactured by Skyworks™, Qorvo™, Qualcomm™, NXP Semiconductors™, etc. Controller 114a may be configured (e.g., through programs 134) to perform a single function (e.g., a braking function in a vehicle, light sensing, object detection, motion sensing, data transmission, etc.), or multiple functions. Controller 114a may perform any number of steps of the exemplary processes discussed herein, consistent with the disclosed exemplary embodiments.

Controller 114a may include a memory space 130 and a processor 138. Memory space 130 may include any aspect of memory space 116, described above. For example, memory space 130 may include one or more storage devices configured to store instructions usable by processor 138 to perform functions related to the disclosed embodiments. In some embodiments, memory space 130 may store data 132, which may include one or more delta files or other form of controller code for influencing controller operation (e.g., a controller software change). Memory space 130 may also be configured with one or more software instructions, such as software program(s) 134 or code segments that perform one or more operations when executed by processor 138 (e.g., a vehicle operation, system environment monitoring operation, industrial system operation, consumer application operation, etc.).

Processor 138 may include one or more dedicated processing units, application-specific integrated circuits (ASICs), field-programmable gate arrays (FPGAs), graphical processing units, or various other types of processors or processing units coupled with memory space 130.

Controller 114a may also include a communication interface 136, which may allow for remote devices to interact with controller 114a. Communication interface 136 may include an antenna or wired connection to allow for communication to or from controller 114a. For example, communication interface 136 may include a Universal Serial Bus (USB) port or other type of connection interface allowing for another device to communicate with controller 114a. As another example, an external device (such as controller 114b, controller 116a, software analysis device 102, or any other device capable of communicating with controller 114a) may transmit code to controller 114a (e.g., a software change file, such as a delta file), such as over a wireless connection, which may instruct controller 114a to perform certain operations, such as changing software stored in memory space 130.

Controller 114a may also include power supply 140, which may be an AC/DC converter, DC/DC converter, regulator, or battery internal to a physical housing of controller 114a, and which may provide electrical power to controller 114a to allow its components to function. In some embodiments, a power supply 140 may exist external to a physical housing of a controller (i.e., may not be included as part of controller 114a itself), and may supply electrical power to multiple controllers (e.g., all controllers within controller system 108a).

Controller 114a may also include input/output device (I/O) 142, which may be configured to allow for a user or device to interact with controller 114a. For example, I/O 142 may include at least one of wired and/or wireless network cards/chip sets (e.g., WiFi-based, cellular based, etc.), an antenna, a display (e.g., graphical display, textual display, etc.), an LED, a router, a touchscreen, a keyboard, a microphone, a speaker, a haptic device, a camera, a button, a dial, a switch, a knob, a transceiver, an input device, an output device, or another I/O device configured to perform, or to allow a user to perform, any number of steps of the methods of the disclosed embodiments, as discussed further below.

Figure 2:
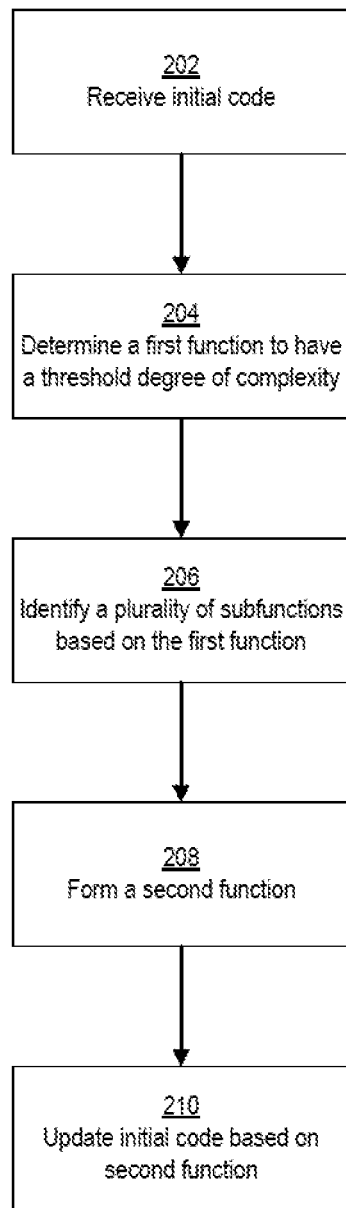
FIG. 2 depicts a flowchart of an exemplary process for changing code based on analysis of functions, consistent with embodiments of the present disclosure.

FIG. 2 illustrates a flowchart of an exemplary process 200 for changing code based on analysis of functions. In accordance with above embodiments, process 200 may be implemented in system architecture 10 depicted in FIG. 1, or any type of IoT network environment. For example, process 200 may be performed by a processor (e.g., processor 124) and/or other components (e.g., network resource 104c), or by any computing device or IoT system.

At step 202, process 200 may receive initial code. The initial code may include one or more lines of code, group of symbols (e.g., functions), etc., and may be compiled or uncompiled. While the techniques discussed herein are programming language-agnostic, in some embodiments, the initial code may be written in a particular programming language, such as C, MISRA-C, C#, C+, C++, PHP, Java, JavaScript, or Python, or any of the programming languages mentioned above. The initial code may be associated with (e.g., configured for) changing code on a controller. For example, the initial code may include code configured to change code on a controller from a first version of code to a second version of code. In some embodiments, initial code may be sourced from remote system 103, accessed from memory space 116, or otherwise accessed by a device performing process 200. In some embodiments, initial code may be represented by a graph, chart, model, or other code structure. Such a representation may be generated by a device implementing process 200, or may be received instead of, or in addition to, the initial code. For example, process 200 may receive an initial code file, and may access or generate a code structure representing the initial code file. In some embodiments, a code structure may be associated with (e.g., may represent) code configured to execute on a controller. In some embodiments, the code structure may comprise an abstract syntax tree (AST), which may include one or more portions of code (e.g., functions) and relationships (e.g., influences, effects, interdependencies, dependencies, code flows, control transfers, variable scopes, etc. between portions of code). In some embodiments, an AST may comprise a plurality of nodes having node types. By way of non-limiting example, a node type may include at least one of a function type, variable type, call type, object type, operator type, literal type, expression type, or a statement type. A node type may identify a type of symbol associated with the node and/or a functional effect (e.g., effect on a device operation, effect on another node, etc.). A node may also be associated with user-defined information (e.g., a node sub-type). In some embodiments, an AST may include thousands (or even hundreds of thousands) of nodes.

At step 204, process 200 may determine a first function to have a threshold degree of complexity. For example, process 200 may determine, by parsing a code structure representing a plurality of functions (e.g., an AST), that at least one first function has a threshold degree of complexity. Parsing a code structure (or any form of code, including compiled or uncompiled code) may include analyzing a code structure or code according to an algorithm or model, consistent with disclosed embodiments. A threshold degree of complexity may be expressed in one or more ways, which may involve one or more attributes associated with (e.g., indicating an aspect of, influencing, or being influenced by) a function. For example, a threshold degree of complexity may be expressed as a function length quantified by at least one of: a number of characters, a number of lines of code, or an amount of storage space (e.g., an amount of storage space associated with a function). Additionally or alternatively, a threshold degree of complexity may be based on an AST (e.g., an AST associated with a single function, such as the first function, or an AST associated with multiple functions, as discussed above). For example, the threshold degree of complexity may be based on (e.g., correlated with or proportional to) a number of branches in an AST, a length of branches in an AST, a number of nodes in an AST, or any combination thereof. Additionally or alternatively, a threshold degree of complexity may be expressed as a size of an abstract syntax sub-tree (e.g., a portion of a larger AST). Additionally or alternatively, a threshold degree of complexity may be based on binary code of a first function. In some embodiments, a first function may include a loop or group of nested portions of code. Additionally or alternatively, a threshold degree of complexity may be based on (e.g., correlated with or proportional to) at least one of: a number of local variables, a number of control-flow loops, a number of references to global variables, a number of references to other functions, or a number of internal references from a function to itself. Additionally or alternatively, a threshold degree of complexity may be based on (e.g., correlated with or proportional to) an execution and/or compilation time. Of course, any combination (e.g., as expressed in an algorithm or model) of these attributes associated with a function may be used to determine complexity (e.g., of the function). Analyzing a code structure may include applying static analysis to the code structure (e.g., using a statistical model), applying dynamic analysis to the code structure (e.g., using a dynamic model), and/or determining a complexity attribute associated with the code structure (e.g., through static or dynamic analysis), such as determining an execution time associated with the code structure, determining an execution timing associated with the code structure, determining an execution sequence associated with the code structure, or determining any other attribute that expresses a degree of complexity, as discussed above. Analyzing a code structure may also include comparing at least one determined complexity attribute to a predetermined complexity threshold.

In some embodiments, process 200 may include receiving a user input and determining the threshold degree of complexity based on the user input. For example, process 200 may receive a user input comprising a level of an AST, a function length, or other indication of a degree of complexity of code. By way of further example, a user may select a part of a visual representation of controller code, such as an AST, to indicate a degree of complexity of code. In some embodiments, a threshold degree of complexity may be determined (or re-determined, as the case may be) at least in part by a machine learning model. A machine learning model may be, for instance, a neural network, a convolution neural network (CNN) model, a clustering model, or a regression model, among others. For example, a machine learning model may be trained (through supervised and/or unsupervised training) using inputs of different initial code to predict favorable ways to re-configure code (e.g., a threshold degree of complexity of functions to use to determine which functions to re-configure). For example, a machine learning model may interpret resulting output, such as updated code, file sizes, function sizes, execution times, degrees of complexity associated with adjusted functions, or any other indication of complexity, based on an input that influences the output, such as the threshold degree of complexity. For example, a machine learning model may predict a threshold degree of complexity that will result in a code change file having subfunctions and/or functions of a reduced length, having reduced length (e.g., number of lines of code), having a reduced file size, having a reduced execution time, and/or having a reduced resource load (e.g., processor load), while still achieving the same functional result (e.g., device functional behavior, device capabilities, device software version, etc.) as the initial file.

At step 206, process 200 may identify a plurality of subfunctions based on the at least one first function (e.g., determined at step 202). Identifying a subfunction may include determining a subset of code (e.g., a self-contained code block within a function) of a function (e.g., the first function) as a subfunction. In some embodiments, process 200 may determine a subset of code of a function according to structure and/or content of the function. For example, the first function may include semicolons, brackets, indentations, control flow statements, a keyword, a key string of characters, or other indicators separating portions of code. Process 200 may use a combination of these indicators to identify subfunctions. For example, process 200 may determine some indicators to use as points delineating the extent of subfunctions and/or may determine some indicators to not use as points delineating the extent of subfunctions (e.g., division of a function into subfunctions). As another example, process 200 may determine that code associated with (e.g., corresponding to or represented by) a branch (or group of branches) of an AST (e.g., an AST representing a function) is a subfunction. In some embodiments, process 200 may determine how to treat indicators based on user-influenced and/or machine-influenced parameters (such as by using machine learning techniques discussed further below). For example, process 200 may determine how to treat indicators based on node types or sub-types of an AST. For example, a particular node type may be designated to not use as a point delineating a subfunction. In some embodiments, such as where a first function includes a loop or group of nested portions of code, process 200 may determine a nested portion of code as a subfunction.

In some embodiments, process 200 may identify the plurality of subfunctions in response to the determination of the first function (e.g., the first function meeting a threshold degree of complexity). In some embodiments, identifying the plurality of subfunctions may comprise extracting at least one of the subfunctions. For example, process 200 may extract a subfunction from the initial code or other portion of software. In some instances, extracting a subfunction may include copying a portion of code from the initial code.

In some embodiments, identifying the plurality of subfunctions may comprise generating at least one of the subfunctions. For example, process 200 may generate at least one subfunction based on a structure, functionality, or content of the initial code (e.g., a function of the initial code). For example, process 200 may determine a subset of code of a function as a subfunction and may generate a shell or other code structure to hold the subset of code as a distinct subfunction (e.g., generate a function having code containing the subset of code, such as an argument, call, line of code, etc.). In some embodiments, process 200 may generate at least one subfunction, which may include one or more second code portions, which may be similar to one or more of the first code portions. For example, a second code portion may be identical to a first code portion, may have an identical functional effect to the first code portion, may have overlapping portions with the first code portion, and/or may have a functional effect similar to a first code portion, based on a predetermined threshold (e.g., execution profile).

In some embodiments, the plurality of subfunctions may have a commonality with the at least one first function. The subfunction commonality may include a commonality of content, structure, and/or function. For example, the commonality may comprise at least one of a common call, argument, statement, variable, operation, block, symbol, and/or line(s) of code. For example, two of the plurality of subfunctions may each include calls that have common portions with each other. As another example, the commonality that the plurality of subfunctions have with the at least one first function may comprise at least one of: a common operation, a common command, a common sequence of commands, a common expression, a common argument, or a common line of code. As yet another example, the commonality may comprise a common syntax, sequence of execution, relationship to a symbol, and/or combination of symbols.

In some embodiments, at least one of the plurality of subfunctions may be associated with an inner subfunction (or other code symbol) called by the first function. In some embodiments, identifying the plurality of subfunctions may comprise identifying at least one block of code and at least one divider distinguishing the at least one block of code from other code. A block of code may be considered a call, a variable, a phrase, at least one line of code, or any other portion of code having an ascertainable meaning. A divider may include a character (e.g., semicolon), a keyword, a key string of text, syntax (e.g., indentation), statement (e.g., break statement), or any other notation indicating the beginning or end of a meaningful portion of code. In some embodiments, the plurality of subfunctions may be determined according to structure and/or content of the function, as discussed above. For example, identifying the plurality of subfunctions may comprise identifying a break term within the first function, where the break term divides a first and second set of case statements. Identifying the plurality of subfunctions may comprise identifying (or generating, accessing, etc.) a first subfunction associated with the first set of case statements and identifying (or generating, accessing, etc.) a second subfunction associated with the second set of case statements. In some embodiments, identifying (or generating, accessing, etc.) the plurality of subfunctions may be based on node types (e.g., node types of an AST, discussed above) and/or a node configuration (e.g., relationships between nodes).

As with determining a function with a threshold degree of complexity, process 200 may also apply machine learning techniques to identifying subfunctions. For example, a machine learning model may learn to predict, based on different code reconfigurations (e.g., different identifications of subfunctions with a function) and resulting function or file characteristics (e.g., performance characteristics, error counts, byte size, etc. of a function or file discussed at steps 208 and 210). Additionally or alternatively, a machine learning model may learn optimal parameters for re-configuring a first function (e.g., into a second function and subfunctions) to call a number of subfunctions that reduces the complexity and/or size of changes to code (including possible future changes), but while also not creating a number of subfunctions or calls past a threshold. Additionally or alternatively, a machine learning model may learn (e.g., through an iterative process involving changing inputs and machine-observance of outputs and changes to outputs) to not use certain indicators as points delineating the extent of subfunctions (discussed above), which may otherwise cause reduced performance quality, errors, breaking changes, or other potentially unwanted aspects.

At step 208, process 200 may form a second function. In some embodiments, a second function may have one or more portions in common with the first function, as well as one or more portions that may not be in common with the first function. For example, process 200 may form a second function by reconfiguring the first function to call at least one of the plurality of subfunctions, which may include adding a new subfunction, function, call, argument, reference to a memory location, or other segment of code to the first function. In some embodiments, reconfiguring the first function may also comprise removing code from the first function or adding code to the first function (e.g., while not changing its functionality). For example, process 200 may cause the first function to call a subfunction that includes a first group of lines of code, where the subfunction includes a second group of lines of code that correspond to the first group of lines of code. In some embodiments, forming a second function may comprise generating local variables or other symbols, which may be part of the second function, and may be in addition to code from the first function. In some embodiments, process 200 may generate at least one new variable and may place the at least one new variable in at least one of the subfunctions (which may or may not be generated, as discussed above), which may be done as part of forming the second function. A visual example of forming a function is demonstrated by FIG. 3.

At step 210, process 200 may update the initial code based on the second function. For example, process 200 may update an initial code file to include the second function. Additionally or alternatively, process 200 may configure the initial code (e.g., software change file, which may be a delta file) to cause removal of the first function from code on a controller (e.g., when the initial code is executed on the controller). Process 200 may also configure the initial code to cause the first function to become non-executable (e.g., de-linking the first function from a sequence of execution, changing a memory address, removing the first function from the initial code, etc.). In some embodiments, process 200 may compare at least one of a size or complexity of a function (or other code segment) associated with (e.g., contained in or represented by) the initial code file to at least one of a size or complexity of a function (or other code segment) associated with the updated initial code file and may, based on the comparison, update a machine learning model (e.g., a machine model configured to predict a smaller or smallest length, file size, execution time, or resource load, as discussed above). By updating the initial code with a re-configured version of a function, a function size, file size, and/or execution time (e.g., execution time associated with the updated initial file) may be reduced, reducing bandwidth and computing resource loads. In some embodiments, process 200 may include steps related to determining a commonality between first code portions (e.g., according to process 500), which may provide further efficiencies of file size, execution time, and reducing resource strain. The updated initial file may be written in one or more programming languages, such as C, MISRA-C, C#, C+, C++, PHP, Java, JavaScript, or Python.

Figure 3:
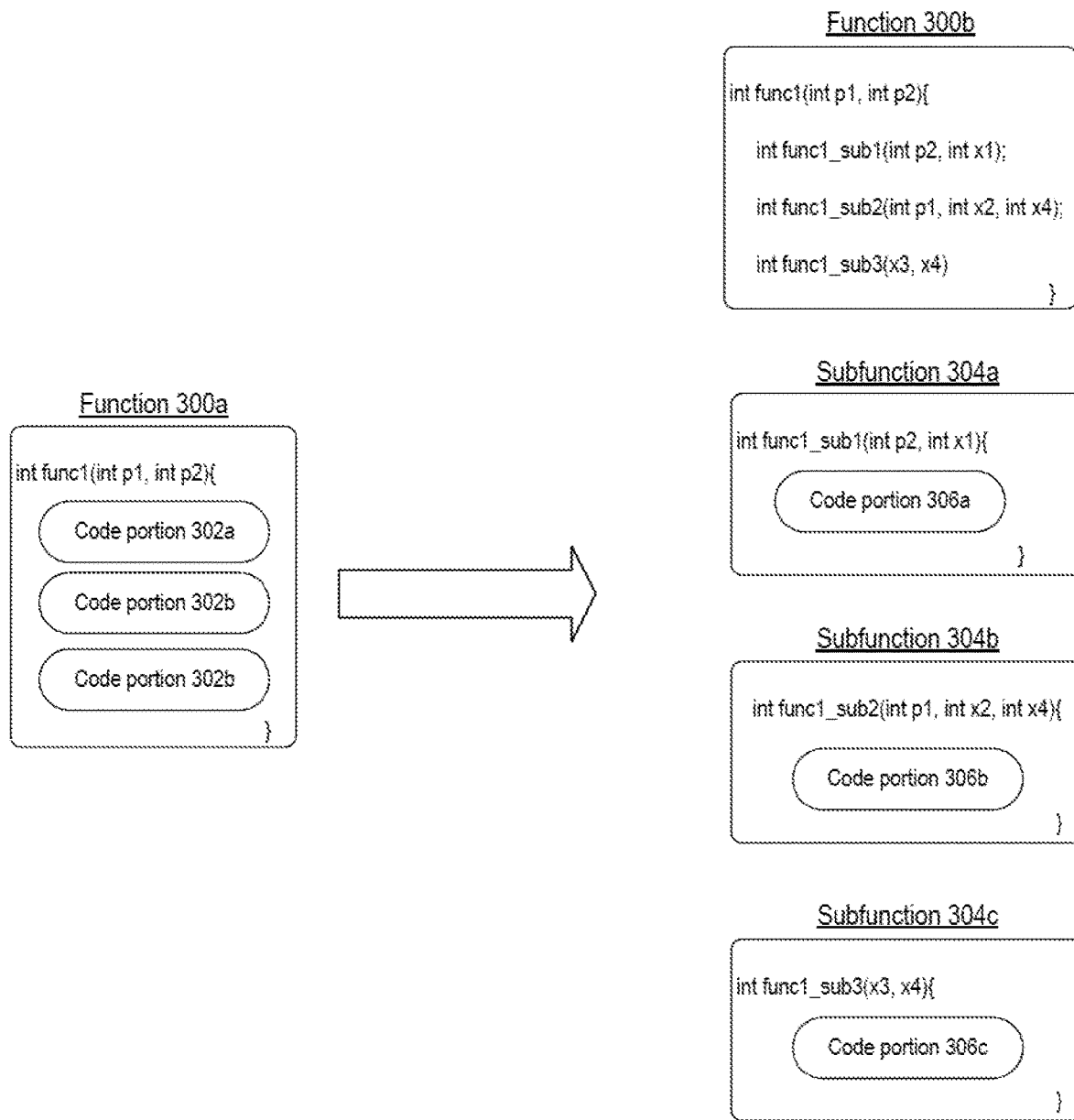
FIG. 3 illustrates an exemplary pictographic representation of changes to code based on analysis of functions, consistent with embodiments of the present disclosure.

FIG. 3 depicts a non-limiting exemplary visual representation of changes to code based on analysis of functions, such as according to process 200. As seen in FIG. 3, a function 300a includes code portion 302a, code portion 302b, and code portion 302c. A code portion may be or represent an amount of computing code, which may or may not be configured for execution. For example, a code portion may be a code symbol, which may be or represent a variable, buffer, function, call, object, statement (e.g., a case statement), identifier (e.g., memory location identifier), compiled code, uncompiled code, a software package (e.g., for a software update), instruction set, or any other segment of code with ascertainable meaning.

As shown in FIG. 3, function 300a may also be represented by function 300b, subfunction 304a, subfunction 304b, and subfunction 304c. In some embodiments, a function and/or subfunction, such as function 300b, subfunction 304a, subfunction 304b, and subfunction 304c, may be generated according to a process for changing code, such as process 200. In some embodiments, a subfunction (e.g., subfunction 304a) may include one or more code portions from an earlier function (e.g., function 300a). In some embodiments, a subfunction (e.g., subfunction 304b) may include less than the entirety of the code in a function (e.g., function 300a). A subfunction may also include additional code not found in a function. In some embodiments, a subfunction and/or function formed based on another function (e.g., function 300a) may include at least one argument that is an argument of the other function. For example, as seen in FIG. 3, subfunction 304a includes "int p2," and subfunction 304b includes "int p1," both of which are arguments of function 300a.

In this example, subfunction 304a includes code portion 302a, subfunction 304b includes code portion 302b, and subfunction 304c includes code portion 302c. Thus, each subfunction includes a code portion from function 300a. In some embodiments, a first function (e.g., function 300b), which may be generated based on an earlier function (e.g., function 300a), may include one or more calls to at least one subfunction, and the at least one subfunction may include a portion of code from the earlier function. As seen in this example, function 300b includes a call to each of subfunctions 304a, 304b, and 304c.

Figure 4:
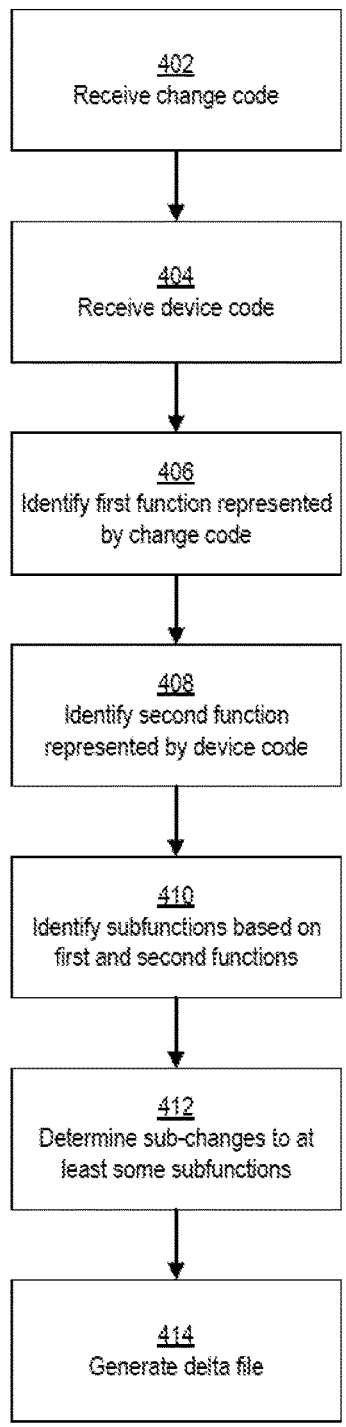
FIG. 4 depicts a flowchart of an exemplary process for generating a delta file based on subfunction analysis, consistent with embodiments of the present disclosure.

FIG. 4 illustrates a flowchart of an exemplary process 400 for generating a delta file based on subfunction analysis. In accordance with above embodiments, process 400 may be implemented in system architecture 10 depicted in FIG. 1, or any type of IoT network environment. For example, process 400 may be performed by a processor (e.g., processor 124) and/or other components (e.g., network resource 104c), or by any computing device or IoT system. In some embodiments, all or part of process 200 may be implemented together with process 400, as well as aspects of other disclosed embodiments.

At step 402, process 400 may receive change code. Change code may represent a change to device code installed on a device, and may include any amount of code associated with updating, downgrading, or otherwise altering code on a device, such as a controller. Change code may or may not be configured to execute on a device. For example, change code may comprise binary code, a software library, a software image, a delta file, or any other file suitable for changing code on a device (e.g., a controller). The change code may be written in one or more programming languages, such as C, MISRA-C, C#, C+, C++, PHP, Java, JavaScript, or Python.

At step 404, process 400 may receive device code. Device code may represent code currently deployed to a device (e.g., a device to which the change code is to be implemented). Device code may also be code representing an earlier version of software relative to the change code. In some embodiments, device code may be received from a device itself. By way of example, a system 100 implementing process 400 may receive device code from controller 110c. As yet another example, device code may be received from remote system 103, which may be associated with a software developer remote from system 100, which may be performing all or part of process 400. In some embodiments, receiving device code may comprise accessing device code stored at a storage component. For example, a system 100 implementing process 400 may access device code from memory space 116.

At step 406, process 400 may identify a first function, represented by the change code. For example, process 400 may identify the first function by parsing the change code or a code structure representing the change code. In some embodiments, the change code may include the first function. In some embodiments, the code structure representing the change code may comprise an AST and/or may include any characteristic of a code structure discussed above with respect to FIG. 2.

At step 408, process 400 may identify a second function, represented by the device code. For example, process 400 may identify the second function by parsing the device code or a code structure representing the device code. In some embodiments, the device code may include the second function. In some embodiments, the code structure representing the device code may comprise an AST and/or may include any characteristic of a code structure discussed above with respect to FIG. 2.

At step 410, process 400 may identify a plurality of subfunctions based on the first and second functions, such as through a deterministic process. In some embodiments, identifying a plurality of subfunctions may include the same or similar aspects discussed regarding process 200. A subfunction may include a variable, an argument, a call, a command, an instruction, or any portion of a function. In some embodiments, identifying a plurality of subfunctions may comprise determining division points between portions of code and designating the portions of code as subfunctions. For example, identifying a plurality of subfunctions may comprise structuring the first and second functions into respective sets of subfunctions representing the functionalities of the first and second functions. In some embodiments, the sets of subfunctions of the first and second functions may be the same. For example, process 400 may refactor the first and second functions into a same structure of subfunctions. Additionally or alternatively, process 400 may determine division points based on user input. For example, a user may designate one or more division points for a function (e.g., dividers, discussed above) and/or may designate a portion of code (e.g., a portion of a function) for non-division (e.g., identifying a portion of code as a subfunction that should not be divided or re-factored). Additionally, in some embodiments, if a version of code changes (e.g., versions of change code, versions of device code, a version of change code relative to a version of device code, etc.), process 400 may change an identified subfunction without changing a determined division point, which may allow for easier tracking or implementation of changes between functions, files, software versions, etc.

In some embodiments, a subset of subfunctions may be identified using one or more criteria. For example, the plurality of subfunctions may be identified based on a structure of at least one function (e.g., the first and/or second function) and/or functional effects of code segments within the at least one function. For example, a subfunction may be identified based on an explicit identifier of a subfunction within a function. Additionally or alternatively, a subfunction identification criterion may be, or may be associated with, a degree of complexity (functional and/or structural), which may be determined based on length (e.g., number of lines of code, number of characters, number of operations, etc.), byte size, interdependency, frequency of use, execution time, an indentation level within lines of code (or other structural differentiator), separation of portions of code (e.g., by keywords, key strings of text, semicolons, colons, brackets, and the like), a position of the portion of code within a hierarchy (e.g., represented by a number of branches in an AST), a functional impact of a portion of code (e.g., determining through modeling code), or any other indicator of function and/or structure of a portion of code within a function.

In some embodiments, identifying the plurality of subfunctions may be based on determining that at least one function (e.g., the first and/or second function) has a threshold degree of complexity. For example, process 400 may determine that portions of code situated at a third level of nodes within an AST should be considered subfunctions. As another example, process 400 may determine that portions of code having a distinct functional effect and having a number of lines of code within a defined range should be considered subfunctions. Of course, any combination of criteria, which may be absolute, variable, relative, statistical, and/or deterministic, may be used to identify subfunctions (e.g., determine division points between portions of code and designate the portions of code as subfunctions).

In some embodiments, one or more identification criteria may be updated over time, such as according to a machine learning technique. For example, a model, such as a neural network, may be trained (e.g., through a recursive process) to determine identification criteria to use to optimize a threshold for determining where to place division points between portions of code for identifying subfunctions, such that a size of a resulting delta file (e.g., generated at step 414) is minimized. By way of further example, a model may examine combinations of inputs (e.g., a function size, AST structure, subfunction identification criterion, etc.) and one or more resulting delta files, and identify relationships (e.g., positive correlations, negative correlations, etc.) between input combinations and delta file sizes.

At step 412, process 400 may determine sub-changes to at least some of the plurality of subfunctions. In some embodiments, the sub-changes may be associated with (e.g., part of) a change to the second function. For example, the change to the second function may be implicated by the change code (e.g., by the first function of the change code). In some embodiments, determining the sub-changes to the at least some of the subfunctions may comprise determining a first set of subfunctions associated with (e.g., related to the implementation of) the sub-changes and determining a second set of subfunctions not associated with (e.g., not related to the implementation of) the sub-changes. In some embodiments, a sub-function change may include a change in the code of a function, a change in a definition of a variable, or a change in an initialization of a variable.

In some embodiments, identifying at least one of the sub-changes comprises parsing an AST of the change code, device code and/or binary code (e.g., resulting from compilation). In some embodiments, at least one of the identified subfunctions may be associated with an inner subfunction called by at least one function (e.g., the first and/or second function). Additionally or alternatively, determining sub-changes to at least some of the plurality of subfunctions may comprise comparing an object file or image file of the change code to an object file or image file of the device code.

At step 414, process 400 may generate a delta file, which may be configured to implement the change code to a device, which may currently implement the device code. A delta file may comprise at least one delta, or difference, between two portions of code (e.g., the change code and the device code). In some embodiments, the delta file may comprise configuration code, in addition to at least one delta, which may be configured to implement the change represented by the delta on a device (e.g., a controller). In some embodiments, the device may include all or a portion of the configuration code.

In some embodiments, the delta file may be generated to comprise object change elements, and the object change elements may be configured to effect the sub-changes to the device code. An object change element may be an instruction, line of code, or any other data representing and/or configured to implement a change to an object file (e.g., a binary file), which may be associated with (e.g., correspond to) a delta file and/or device code. For example, if a local index in a loop is initialized to "5" in a first version of code (e.g., device code, older code) and in a second version of code (e.g., change code, newer code) it is initialized to "7," an object change element may be generated and/or configured to effect the change in the local index to an object file (e.g., and object file associated with the loop). In some embodiments, each object file may be associated with a different object (e.g., function, variable) within a set of code (e.g., software change, delta file, device code). In some embodiments, a linker may link multiple object files (e.g., all object files associated with a delta file, associated with a software change file) into a single file (e.g., binary file). For example, each object change element may correspond to a sub-change. In some embodiments, at least one of the object change elements may be configured to change the second function in the device code. In some embodiments, the object change elements may correspond to the first set of subfunctions (discussed above) and not the second set of subfunctions (also discussed above). Thus, by localizing sub-changes to particular subfunctions, smaller changes to a delta file (or other type of file) can be represented, rather than a larger change to an entire function, allowing for a smaller resulting software change file (e.g., delta file). For instance, referring back to the local index and loop example above, if the loop was previously extracted into a subfunction, an object file for the loop could be brought into a software change file, rather than the object file of the entire function.

In some embodiments, process 400 may also include transmitting the delta file to a device. For example, process 400 may transmit the delta file to a device to which the delta file is configured to effect software changes (e.g., function changes, sub-changes, etc., as discussed above). In some embodiments, the device may be a controller, such as an electronic control unit (ECU) in an automobile.

In some embodiments, process 400 may transmit the delta file based on one or more determinations. For example, process 400 may determine that a remote device or system (e.g., system 108c), which may have a first version of code, has an established connection with another device (e.g., software analysis device 102) that has access to (e.g., within local storage, such as at a network resource) a delta file to implement a second version of code on the remote device or system. For example, process 400 may determine that an impact to runtime associated with the delta file is below a threshold, and may transmit the delta file based on the determined impact to runtime being below the threshold. Additionally or alternatively, process 400 may determine that at least one reliability criterion of bandwidth, latency, signal strength, storage space, version compatibility, or other reliability parameter for a transmitting and/or receiving device is satisfied, and may transmit the delta file based on determining the reliability criterion to be satisfied.

In this manner, process 400 may reduce the size of a software change file. By generating a delta file, which may only include localized changes implicated by a software change, a larger software file, such as an image file, may not need to be generated and/or transmitted to a device, saving bandwidth as well as computing resources at both a device generating the delta file and a device receiving the delta file. By determining sub-changes to subfunctions, which may be represented by a smaller amount of code than changes to functions, the size of a software change file may be reduced, thus saving bandwidth and other computing resources, as well as resulting in faster transmission and updating. In some embodiments, steps of process 300 may be incorporated into process 400 (e.g., updating change code and/or device code with a re-configured version of a function), to further improve efficiencies.

Figure 5:
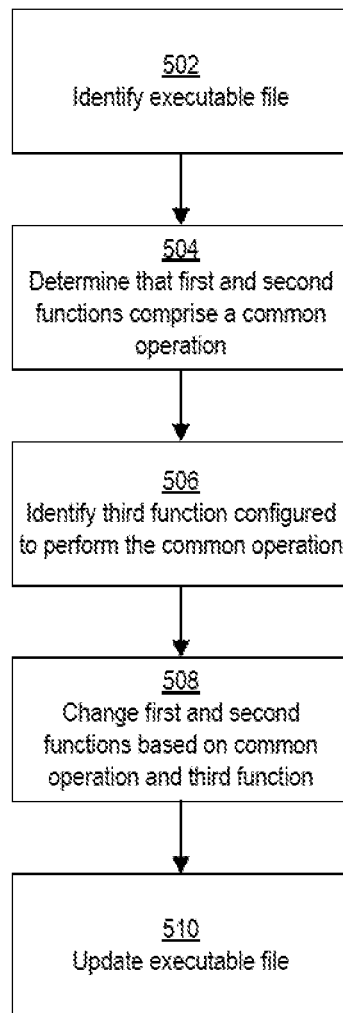
FIG. 5 depicts a flowchart of an exemplary process for updating an executable file based on function analysis, consistent with embodiments of the present disclosure.

FIG. 5 illustrates a flowchart of an exemplary process 500 for updating an executable file based on function analysis. In accordance with above embodiments, process 500 may be implemented in system architecture 10 depicted in FIG. 1, or any type of IoT network environment. For example, process 500 may be performed by a processor (e.g., processor 124) and/or other components (e.g., network resource 104c), or by any computing device or IoT system.

At step 502, process 500 may identify an executable file, which may have a plurality of functions. In some embodiments, the executable file may include a plurality of object files, which may correspond to respective symbols. The executable file may be written in one or more programming languages, such as C, MISRA-C, C#, C+, C++, PHP, Java, JavaScript, or Python. While an executable file is described in process 500, this type of file is merely exemplary, and other types of files, such as files of uncompiled code, may also be used according to process 500.

At step 504, process 500 may determine that a first and second function each comprise a common block. A common block may a block that is similar (e.g., within a threshold) or identical, semantically and/or substantively, between two subjects of comparison (e.g., functions). A block may include one or more operations, instructions, commands, strings of text, calls, indentations, portions of whitespace, lines of code, or any segment of code (e.g., a code segment within a function). For instance, a common block may be found in the following exemplary scenarios:

A. Exact clones—blocks between a first and a second function are identical code segments except for changes in comments, layouts and/or whitespaces;
B. Renamed clones—blocks between a first and a second function are syntactically or structurally similar other than changes in comments, identifiers, types, literals, and/or layouts;
C. "Near miss" clones—blocks between a first and a second function have some overlap, such as where copied pieces of the first function exist within the second function, but with modification such as addition or removal of statements and changes in whitespaces, identifiers, layouts, comments, and types, though the functional outcomes of the functions are similar;
D. Semantic clones—the first and second functions have blocks that are functionally similar but implemented by different syntactic variants.

Process 500 may determine that a first and second function each comprise a common block through one or more steps, such as examining a formalistic, structural, and/or functional trait of the first and/or second function. For example, determining that the first and second function each comprise the common block may comprise determining an identifier associated with (e.g., having a data linkage with) the common block. Furthering this example, the identifier may comprise a combination of characters (e.g., a method name, an expression name, etc.). Additionally or alternatively, determining that the first and second function each comprise a common block may comprise determining that the first and second function each comprise a common command or common sequence of commands. Additionally or alternatively, process 500 may determine that the first and second function each comprise the common block by parsing (and, in some embodiments, extracting information from) the executable file or a code structure representing the executable file. As discussed above, a code structure may comprise an AST or other code representation or abstraction. In some embodiments, process 500 may determine that the first and second function each comprise the common block by comparing code from the first and/or second function to portions of code maintained in a database or other storage medium.

Determining that a first and second function each comprise a common block may comprise determining multiple code portions are part of a same function, multiple code portions calling the same symbol, a common symbol relationship, etc. A code portion may include one or more symbols and/or lines of code. A symbol may be or represent any of a variable, buffer, function, call, object, statement (e.g., a control-flow statement), identifier (e.g., memory location identifier), device, command, or distinguishable segment of code. The term "line of code" is not necessarily limited to literal lines of code, but may also include, instead of or in addition to lines of code, an abstract code representation, compiled code, uncompiled code, a software package (e.g., for a software update), an instruction set, and/or any software whose content, structure, or function may be analyzed and/or configured (e.g., according to the methods discussed herein).

In some embodiments, determining that the first and second function each comprise the common block may comprise determining a similar effect (e.g., to an operation of an associated device or system) caused by the common operation. In some embodiments, determining the similar effect may comprise performing, on the first and/or second functions (or associated blocks, subfunctions, etc.), at least one of a static or dynamic analysis. For example, process 500 may analyze a combination of memory addresses accessed, execution time, a sequence of execution, variables accessed, functions called, resource usage, and the like, such as by using a deterministic or stochastic process. Static and/or dynamic analysis may be performed using the first and/or second function (or associated blocks, subfunctions, etc.), as well as known operational characteristics of a device (e.g., a controller capable of implementing the first function, second function, and/or an associated block or subfunction). In some embodiments, the common operation may be identified according to a machine learning model. For example, a fully supervised, partially supervised, or fully unsupervised model may be trained over time to identify certain functional effects based on certain combinations of code and/or interactions between portions of code. For example, a machine learning model (e.g., a neural network) may be configured to identify code similarity in a semantic sense (e.g., identifying formalistically different pieces of code that have functionally identical, or near identical, behavior). For example, the machine learning model may receive two pieces of codes that appear linguistically different (e.g., sorting algorithms Quick Sort and Merge Sort), and based on analyzing the computing behavior of the two pieces of code (e.g., yielding exactly the same output), may determine that the two pieces of code are semantically similar and functionally identical (or near identical).

At step 506, process 500 may identify a third function configured to perform the common block. In some embodiments, identifying the third function may comprise generating and/or accessing (e.g., from local or remote storage) the third function. In some embodiments, the third function may be generated based on a structure and/or content of the first and second functions. For example, the first and second functions may both include a common block, such as a function, operation, call, sequence of commands, etc. (as discussed above). Continuing this example, the third function may be generated to include (e.g., implement) the same common block of the first and second functions. Two blocks may be considered common if they share a same structure, syntax, functional effect, sequence of characters, or the like. In some embodiments, generating the third function may comprise generating a new symbol. For example, a third function may include a loop based on repeat behavior (e.g., operations) of blocks in the first and second functions, and process 500 may generate a "loopmax" variable for the loop.

At step 508, process 500 may change the first and second functions, which may be based on the common operation and the third function. In some embodiments, process 500 may change the first and second functions by removing the common operation from at least one of the first or second functions and inserting a call to the third function (which may include the common operation) into at least one of the first or second functions.

At step 510, process 500 may update the executable file. In some embodiments, process 500 may update the executable file by replacing, in the executable file, at least one of the first or second functions with at least one of the updated first or second functions and adding the third function to the executable file. In some embodiments, the executable file may be at least one of: configured to execute on a controller prior to the updating or configured to execute on a controller after the updating. The updated executable file may be written in one or more programming languages, such as C, MISRA-C, C#, C+, C++, PHP, Java, JavaScript, or Python. In some embodiments, process 500 may perform at least one operation to confirm integrity of the updated executable file. For example, process 500 may perform analysis of the updated executable file relative to the un-updated executable file to determine if the updated executable file is a functional equivalent of the un-updated executable file. In some embodiments, analysis of the updated executable file may include a static or dynamic process, which may include comparing and/or analyzing, for the updated executable file and/or un-updated executable file, at least one of an execution path, memory locations accessed, an execution time, devices or code interacted with, a resource usage, an operation frequency, or any other code attribute that may be used to determine a functional difference and/or equivalency.

Figure 6:
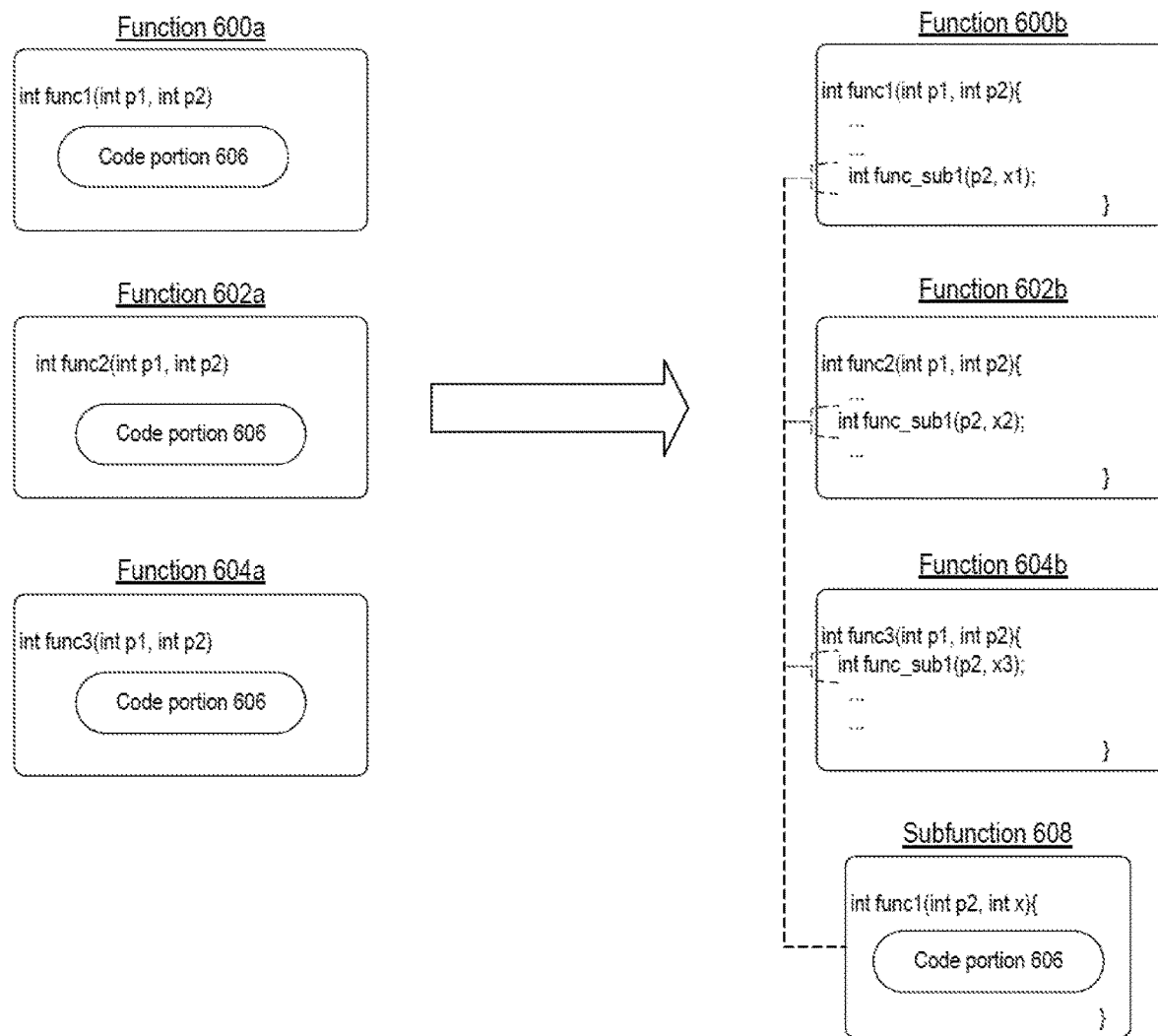
FIG. 6 illustrates an exemplary pictographic representation of re-configuring of functions based on a common code portion, consistent with embodiments of the present disclosure.

FIG. 6 depicts a non-limiting exemplary visual representation of re-configuring of functions based on a common code portion, such as according to process 500. As seen in FIG. 6, a function 600a, function 602a, and function 604a may each include (e.g., be configured to implement) code portion 606 (e.g., a common operation). A code portion may be or represent an amount of computing code, which may or may not be configured for execution. For example, a code portion may be a code symbol, which may be or represent a variable, buffer, function, call, object, statement (e.g., a case statement), identifier (e.g., memory location identifier), compiled code, uncompiled code, a software package (e.g., for a software update), instruction set, or any other segment of code with ascertainable meaning.

As shown in FIG. 6, function 600a may be re-configured into function 600b, function 602a may be re-configured into function 602b, and function 604a may be re-configured into function 604b. Functions 600b, 602b, and 604b may not include (e.g., be configured to implement) code portion 606. Subfunction 608, however, may include (e.g., be configured to implement) code portion 606. As shown in FIG. 6, functions 600b, 602b, and 604b may be configured to call subfunction 608 (as indicated by the dashed lines connecting lines of code in functions 600b, 602b, and 604b to subfunction 608).

Figure 7:
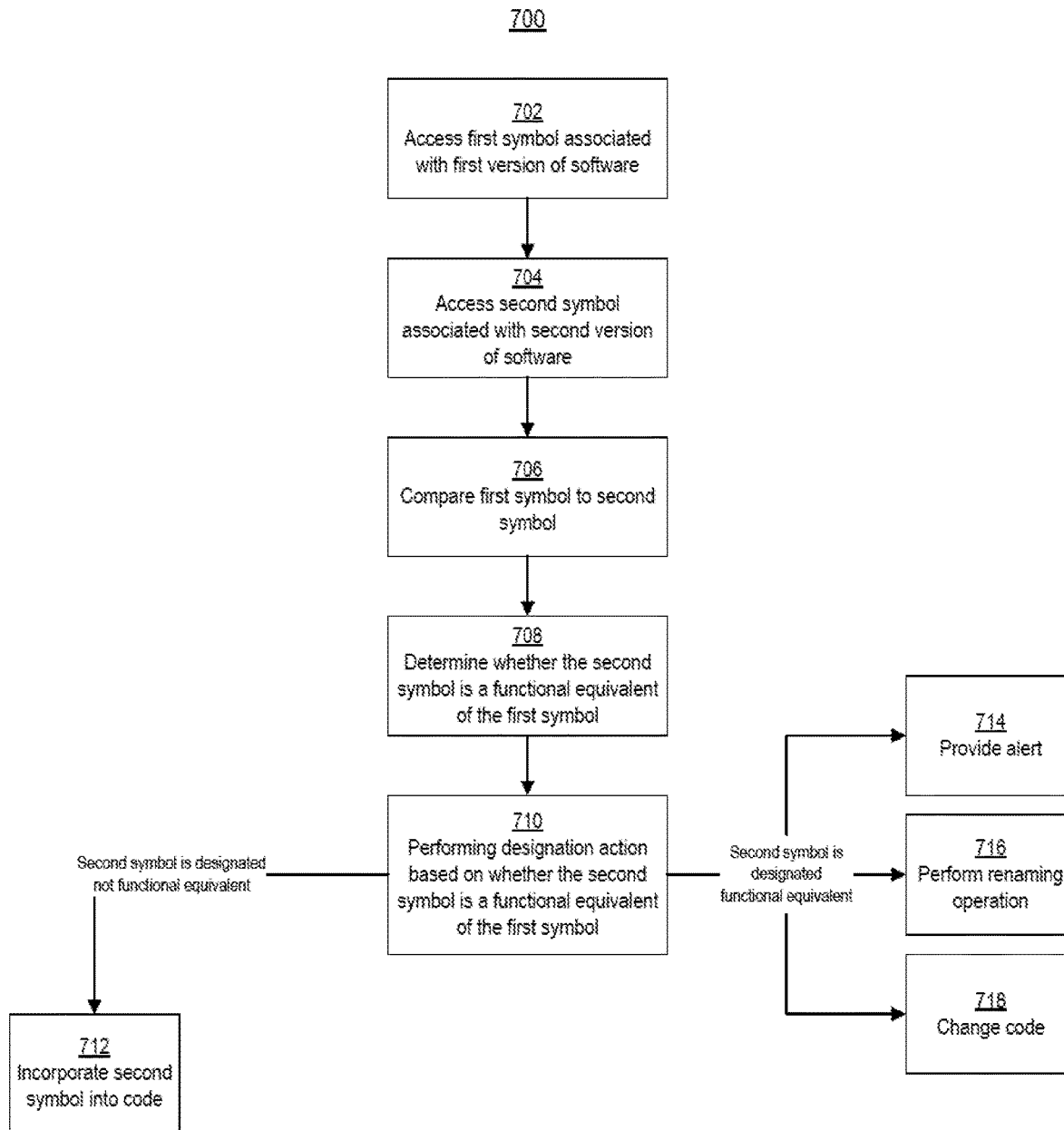
FIG. 7 depicts a flowchart of an exemplary process for identifying symbol commonalities and divergences, consistent with embodiments of the present disclosure.

FIG. 7 illustrates a flowchart of an exemplary process 700 for identifying symbol commonalities and divergences. In accordance with above embodiments, process 700 may be implemented in system architecture 10 depicted in FIG. 1, or any type of IoT network environment. For example, process 700 may be performed by a processor (e.g., processor 124) and/or other components (e.g., network resource 104c), or by any computing device or IoT system. By identifying commonalities and divergences between symbols, process 700 may determine a smaller degree of changes needed to code to reflect the divergences, which may result in faster code updates, smaller file sizes, and less computer resource usage.

At step 702, process 700 may access a first symbol associated with (e.g., contained within or represented within) a first version of software. A symbol may share any characteristic of a symbol discussed above with respect to FIG. 2. For example, a symbol may represent a function. Accessing a first symbol may comprise accessing a software change file, image file, or other software representing the first version, which may be written in one or more programming languages, such as C, MISRA-C, C#, C+, C++, PHP, Java, JavaScript, or Python. In some embodiments, process 700 may translate non-position-independent code to position-independent code, and may access the first symbol from the position-independent code. In some embodiments, process 700 may also represent a symbol (e.g., within a software file) as a reference to a memory location associated with (e.g., storing) the symbol (e.g., a position in a position-independent code table).

At step 704, process 700 may access a second symbol associated with a second version of software. In some embodiments, the second version of software may be represented by a software change file, or other software file, which may be written in one or more programming languages, such as C, MISRA-C, C#, C+, C++, PHP, Java, JavaScript, or Python. For example, the software change file may be configured to implement the second version of software (e.g., update software on a device from the first version to the second version). In some embodiments, the software change file may be a delta file (discussed above). For example, the software change file may be a delta file having one or more deltas that represent changes between the first and second versions of software. In some embodiments, process 700 may translate non-position-independent code to position-independent code, and may access the second symbol from the position-independent code. As mentioned above, process 700 may also represent a symbol (e.g., within a software file) as a reference to a memory location associated with the symbol.

At step 706, process 700 may compare the first symbol to the second symbol. Comparing the first symbol to the second symbol may include a text comparison, structural comparison, operation comparison, statistical comparison, and/or a functional comparison. For example, comparing the first symbol to the second symbol may comprise comparing a first file name associated with the first symbol to a second file name associated with the second symbol. As another example, comparing the first symbol to the second symbol may comprise comparing a first symbol name of the first symbol to a second symbol name of the second symbol.

Additionally or alternatively, comparing the first symbol to the second symbol may comprise comparing a first call graph of the first symbol with a second call graph of the second symbol. In some embodiments, process 700 may generate the first call graph and/or second call graph. Process 700 may also access the first call graph and/or second call graph, such as by accessing a call graph from a storage device or receiving a call graph from a remote device. Process 700 may also compare portions of different call graphs, which may include determining boundaries between portions of a call graph. Additionally or alternatively, process 700 may compare ASTs representing usages of the first and second symbols.

Additionally or alternatively, comparing the first symbol to the second symbol may comprise comparing executional contexts associated with the first and/or second symbols. For example, process 700 may compare a first group of operations performed before and/or after execution of one function (e.g., a first symbol) to a second group of operations performed before and/or after execution of another function (e.g., a second symbol). Additionally or alternatively, comparing the first symbol to the second symbol may comprise comparing a first sequence of calls associated with the first symbol with a second sequence of calls associated with the second symbol. Of course, other functional comparisons are contemplated. For example, process 700 may determine functional profiles of the first and second symbols using static or dynamic analysis, and may compare the functional profiles.

At step 708, process 700 may determine whether the second symbol is a functional equivalent of the first symbol. The determination may be based on the comparing. For example, process 700 may determine that the second symbol is a functional equivalent of the first symbol when the first file name matches the second file name and the first symbol name matches the second symbol name (e.g., based on comparisons at step 706). Additionally or alternatively, process 700 may determine that the second symbol is a functional equivalent of the first symbol when the first call graph matches the second call graph. Additionally or alternatively, process 700 may determine that the second symbol is a functional equivalent of the first symbol when the first sequence matches the second sequence (e.g., sequences of calls, operations, etc.). Additionally or alternatively, process 700 may determine that the second symbol is a functional equivalent of the first symbol when a functional profile of the second symbol matches a functional profile of the first symbol. A "match" may refer to an identical match or a match within a threshold. For example, two symbols with the same functional profile except for a difference of one millisecond of execution time may still be considered to match.

At step 710, process 700 may perform a designation action based on whether the second symbol is a functional equivalent of the first symbol. A designation action may involve associating an identifier of a symbol with a label (e.g., in a table), placing a symbol into a group of similar symbols (e.g., symbols with a same designation), associating metadata with a symbol, and/or performing any operation to indicate that a symbol is related to (e.g., is a functional equivalent of) another symbol, including possibly indicating that a symbol has no relationship with another symbol. In some embodiments, performing the designation action may comprise, if the second symbol is a functional equivalent of the first symbol, designating the second symbol as a match with the first symbol. Additionally or alternatively, performing the designation action may comprise, if the second symbol is not a functional equivalent of the first symbol, designating at least one of the first or second symbols as either new or deleted. For example, the first symbol (e.g., associated with an older version of code) may be designated as deleted, and the second symbol (e.g., associated with a newer version of code) may be designated as new. In some embodiments, process 700 may perform additional actions based on determining that the second symbol is or is not a functional equivalent of the first symbol. For example, process 700 may proceed to step 712 if the second symbol is designated as not a functional equivalent of the first symbol. Process 700 may also proceed to any one or a combination of steps 714, 716, and 718 if the second symbol is designated as a functional equivalent of the first symbol. Of course, one or more first symbols may be compared to one or more second symbols, and some comparisons may yield a designation of a match (e.g., a functional equivalent), and some comparisons may yield a designation of a non-match (e.g., not a functional equivalent). By determining which symbols have a "match" and determining which symbols do not (e.g., symbols that are "new" relative to a version of software), process 700 may reduce a number of operations to perform (e.g., to implement a code change). In some embodiments, symbol matches may be one-to-one (e.g., a symbol associated with a second version of code may only be matched, or matchable, with one symbol associated with the first version of code).

At step 712, process 700 may incorporate the second symbol into code. For example, process 700 may update the first version of software to a second version of software using the second symbol. Updating the first version of software to a second version may include inserting new code, deleting code, making connections between portions of code, severing connections between portions of code, un-compiling code, and/or compiling code. For example, process 700 may add code associated with the second symbol to the first version of software and recompile the first version of software into a file (e.g., delta file, software update file, image file, etc.), which may represent a second version of software, and which may be written in one or more programming languages, such as C, MISRA-C, C#, C+, C++, PHP, Java, JavaScript, or Python. In some embodiments, process 700 may create an association between the second symbol and other information, such as a symbol designation and/or memory location, within a position-independent code table. In some embodiments, a position-independent code table may include indexed information, such as indexed addresses (e.g., addresses associated with functions or other code segments). By way of example, an index indicator of "PIT[345]" may be associated with a location in the position-independent code table that stores an address associated with a function, "Func1." This may allow for indirect reference to "Func1." For example, "X=PIT [345]( )+7" may be written to accomplish the same effect as "X=Func1( )+7."

At step 714, process 700 may provide an alert. Providing an alert may include transmitting a message, generating a graphical user interface (GUI) prompt (e.g., at a display that is part of I/O 126), causing a device to issue an audible sound, causing a display to change displayed information, causing a device to vibrate, or producing and/or making available an indication of information (e.g., information indicating a determination made at step 708), etc. In some embodiments, process 700 may provide the alert to a local device (e.g., a device implementing process 700), such as software analysis device 102, or to a remote system or device (e.g., a device remote from a device implementing process 700), such as remote system 103. For example, process 700 may transmit an instruction to cause a display to show a visual indicator of whether one symbol is a functional equivalent of another symbol.

At step 716, process 700 may perform a renaming operation. In some embodiments, process 700 may rename a filename, a program, a symbol, a memory location, or the like. For example, process 700 may rename the software change file and/or rename the second symbol, which may be in the software change file. In some embodiments, process 700 may rename a symbol identifier or other symbol information, which may be stored in a position-independent table. In some embodiments, process 700 may rename a first symbol to match the name of a second symbol, or vice versa.

In some embodiments, renaming a first symbol to match a name of a second symbol having a same functional effect, content, etc. as the first symbol may reduce software changes, software size (e.g., expressed in bytes), an amount of compilation, an amount of re-compilation, etc.

At step 718, process 700 may change code. In some embodiments, process 700 may change code associated with the first and/or second versions of software. For example, process 700 may change code in the software change file. In some embodiments, process 700 may change code by removing a portion of code associated with the second symbol from the software change file.

In some embodiments, comparing the first symbol to the second symbol may comprise performing multiple comparisons of increasing computational intensity, which may allow symbol matches to be determined more quickly and with less strain on processing resources. For example, performing text comparisons may be performed more quickly than functional comparisons. In some embodiments, process 700 may perform less computationally involved comparisons to a set of symbols first, determine a first subset of symbols that match with a second subset of symbols, and then apply more computationally involved comparisons involving other subsets (e.g., remaining symbols not in the first or second subsets). Consistent with disclosed embodiments, process 700 may access first symbols associated with a first version of software. Process 700 may also access one or more second symbols associated with a second version of the software. Accessing the one or more first and second symbols may include aspects discussed above, such as with respect to steps 702 and 704.

In some embodiments, process 700 may perform first comparisons between the first and second symbols to determine name-matching and non-name-matching first and second symbols. In some embodiments, the first comparisons may comprise comparisons between characters of the first and second symbols. Process 700 may also perform second comparisons between the non-name-matching first and second symbols to determine call-graph-matching and non-call-graph-matching first and second symbols. In some embodiments, the second comparisons may comprise comparisons between call graphs of the first and second symbols. Process 700 may also perform third comparisons between the non-call-graph-matching first and second symbols to determine call-sequence-matching and non-call-sequence-matching first and second symbols. In some embodiments, the third comparisons may comprise comparisons between call sequences of the first and second symbols. In some embodiments, process 700 may perform other comparisons between first and second symbols, which may involve comparing aspects of code form, code structure, code function, and any other aspect discussed above with respect to FIG. 7 (e.g., steps 706 and 708).

In some embodiments, process 700 may reorganize code representing a second version of software based on the first, second, and third comparisons. Re-organizing code may include aspects discussed above with respect to steps 712, 714, 716, and/or 718. For example, process 700 may incorporate a first portion of second symbols into code based on the first comparisons, incorporate a second portion of second symbols into code based on the second comparisons, and/or incorporate a third portion of second symbols into code based on the third. comparisons.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways. For example, aspects discussed with respect to different processes may be combined to form another process. As one example, code may be reconfigured according to process 200, and then used for shrinking a delta file (e.g., according to process 400) or shrinking an executable file (e.g., according to process 500). As yet another example, symbols may be matched according to process 700, which may reduce an amount of code for configuration or re-configuration (e.g., according to process 200, 400, and/or 500). Moreover, while some aspects may be discussed with respect to, for example, a function, subfunction, or a variable, it is fully appreciated that these may apply equally to any symbol or block of code (discussed above).

As another example, while some embodiments are discussed in a context involving electronic controller units (ECUs) and vehicles, these elements need not be present in each embodiment. While vehicle communications systems are discussed in some embodiments, other electronic systems (e.g., IoT systems) having any kind of controllers may also operate within the disclosed embodiments. Such variations are fully within the scope and spirit of the described embodiments. Similarly, any code and/or representations of code discussed herein may be associated with (e.g., configured to execute on) a controller, including a controller of a particular type.

The disclosed embodiments may be implemented in a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, such as those mentioned above, and including low-level assembly language, an object oriented programming language such as Smalltalk, C++ or the like, and conventional procedural programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions. Moreover, while a particular set and order of steps and/or blocks may be shown, the steps and/or blocks can be modified in any manner, such as by re-ordering, inserting, repeating, deleting, or combining (even from different processes) steps and/or blocks.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed repeatedly (e.g., as part of one or multiple processes), and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In some embodiments, aspects of different processes may be combined. For example, a threshold of complexity may be determined in process 300 according to aspects discussed relative to process 200. As another example, a file may be updated according to any combination of processes 200, 400, 500, and 700, which may result in improved results (e.g., even smaller file sizes).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed, and the scope of the terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer-readable medium including instructions that, when executed by at least one processor, cause the at least one processor to perform operations for reducing sizes of files, the operations comprising:
   identifying a file having a plurality of functions;
   determining that a first function and second function each comprises a common block;
   identifying a third function configured to implement a functional effect of the common block;
   changing the first and second functions by:
      removing the common block from at least one of the first or second functions; and
      inserting a call to the third function into at least one of the first or second functions; and
   updating the file by:
      replacing, in the file, at least one of the first or second functions with at least one of the changed first or second functions; and
      adding the third function to the file.

2. The non-transitory computer-readable medium of claim 1, wherein the file is an executable file.

3. The non-transitory computer-readable medium of claim 2, wherein the updated file is an executable file configured to execute on a controller after the addition of the third function.

4. The non-transitory computer-readable medium of claim 1, wherein the file includes uncompiled code.

5. The non-transitory computer-readable medium of claim 1, wherein the common block represents a semantic similarity between the first function and the second function.

6. The non-transitory computer-readable medium of claim 1, wherein the common block represents a similarity between the first function and the second function.

7. The non-transitory computer-readable medium of claim 1, wherein the common block includes at least one of an operation, instruction, command, string of text, call, or code segment included in the first function and the second function.

8. The non-transitory computer-readable medium of claim 1, wherein determining that a first and second function each comprise a common block comprises parsing the file or a representation of the file.

9. The non-transitory computer-readable medium of claim 1, wherein the third function is generated based on a structure or content of the first and second functions.

10. The non-transitory computer-readable medium of claim 1, the operations further comprising confirming an integrity of the updated file.

11. The non-transitory computer-readable medium of claim 1, wherein determining that a first and second function each comprise a common block comprises at least one of:
   performing static analysis on the first and second functions; or
   performing dynamic analysis on the first and second functions.

12. The non-transitory computer-readable medium of claim 11, wherein performing the static analysis or the dynamic analysis uses a known operational characteristic of a device.

13. The non-transitory computer-readable medium of claim 1, wherein the third function includes the common block.

14. A computer-implemented method for reducing sizes of executable files, comprising:
   identifying a file having a plurality of functions;
   determining that a first function and second function each comprises a common block;
   identifying a third function configured to implement a functional effect of the common block;
   changing the first and second functions by:
      removing the common block from at least one of the first or second functions; and
      inserting a call to the third function into at least one of the first or second functions; and
   updating the file by:
      replacing, in the file, at least one of the first or second functions with at least one of the changed first or second functions; and
      adding the third function to the file.

15. The method of claim 14, wherein the updated file is an executable file configured to execute on a controller after the addition of the third function.

16. The method of claim 14, wherein the common block represents a similarity between the first function and the second function.

17. The method of claim 14, wherein determining that a first and second function each comprise a common block comprises parsing the file or a representation of the file.

18. The method of claim 14, wherein the third function is generated based on a structure or content of the first and second functions.

19. The method of claim 14, wherein determining that a first and second function each comprise a common block comprises at least one of:
   performing static analysis on the first and second functions; or
   performing dynamic analysis on the first and second functions.

20. The method of claim 14, wherein the third function includes the common block.

\* \* \* \* \*